United States Patent [19]

Clark et al.

[11] 4,416,700
[45] Nov. 22, 1983

[54] PROCESS FOR TREATING CARAMEL COLORS

[75] Inventors: Allen V. Clark, Winter Park, Fla.;
Dirck V. Myers, Atlanta, Ga.;
Vaughn I. Hatch, Huntertown, Ind.

[73] Assignee: The Coca Cola Company, Atlanta, Ga.

[21] Appl. No.: 285,131

[22] Filed: Jul. 20, 1981

[51] Int. Cl.³ .......................... A23L 1/27; C13D 3/16
[52] U.S. Cl. .............................. 127/34; 127/DIG. 1;
127/55; 210/639; 210/651; 210/806; 210/917
[58] Field of Search ............... 210/639, 650, 651, 806,
210/617, 917; 426/540; 127/29, 30, 34, 55, DIG. 1

[56] References Cited

U.S. PATENT DOCUMENTS

| | | |
|---|---|---|
| 3,249,444 | 5/1966 | Bollenback et al. .................. 127/34 |
| 3,758,405 | 9/1973 | Fremont ......................... 210/639 X |
| 3,799,806 | 3/1974 | Madsen .......................... 210/639 X |
| 4,225,432 | 9/1980 | Booth et al. .................... 210/639 X |

FOREIGN PATENT DOCUMENTS

| | | |
|---|---|---|
| 53-18244 | 2/1978 | Japan ................................. 210/639 |
| 54-69579 | 6/1979 | Japan ................................. 210/639 |

*Primary Examiner*—Kenneth M. Schor

[57] ABSTRACT

Caramel color concentrates are prepared by subjecting a mixture of caramel color and water to ultrafiltration through a semi-permeable membrane, wherein the pH and/or ionic strength of the caramel color/water mixture, at all or particular stages of the ultrafiltration process, is regulated so as to obtain desirable processing and product attributes, such as increased retention of desired properties of the starting caramel color, increased removal of low molecular weight materials during ultrafiltration and increased rates of ultrafiltration.

1 Claim, 11 Drawing Figures

Fig. 2.
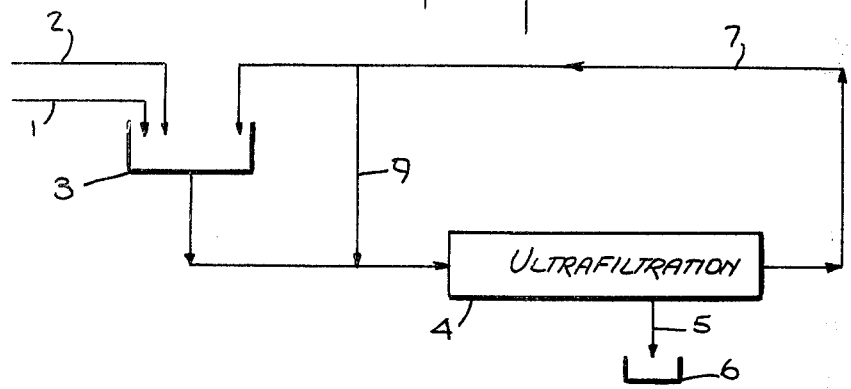
A.
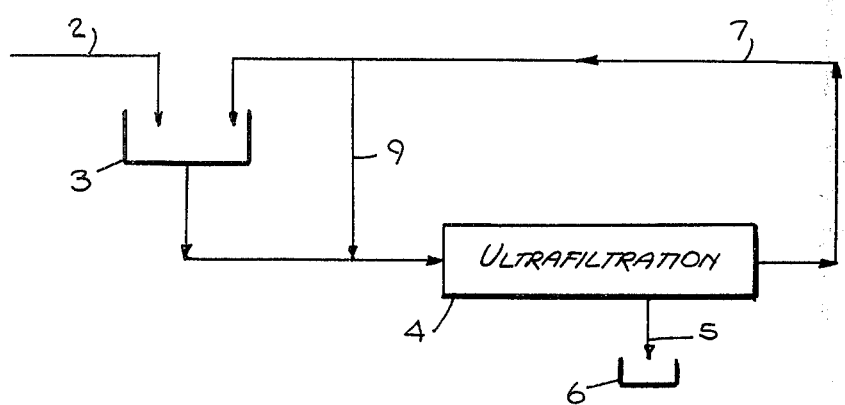
B.
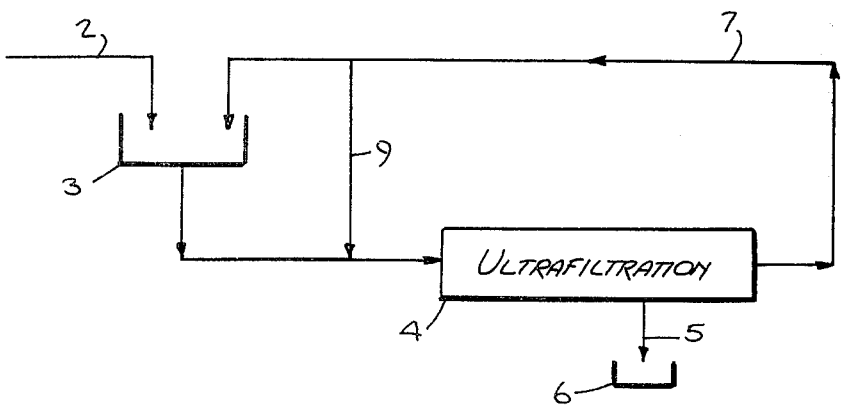
C.
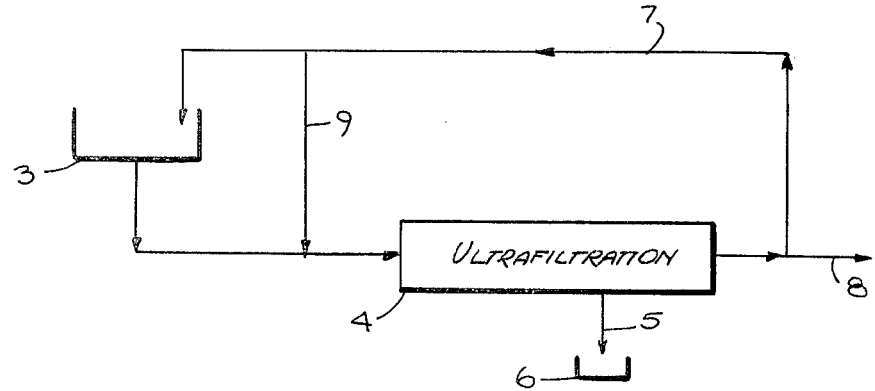
D.

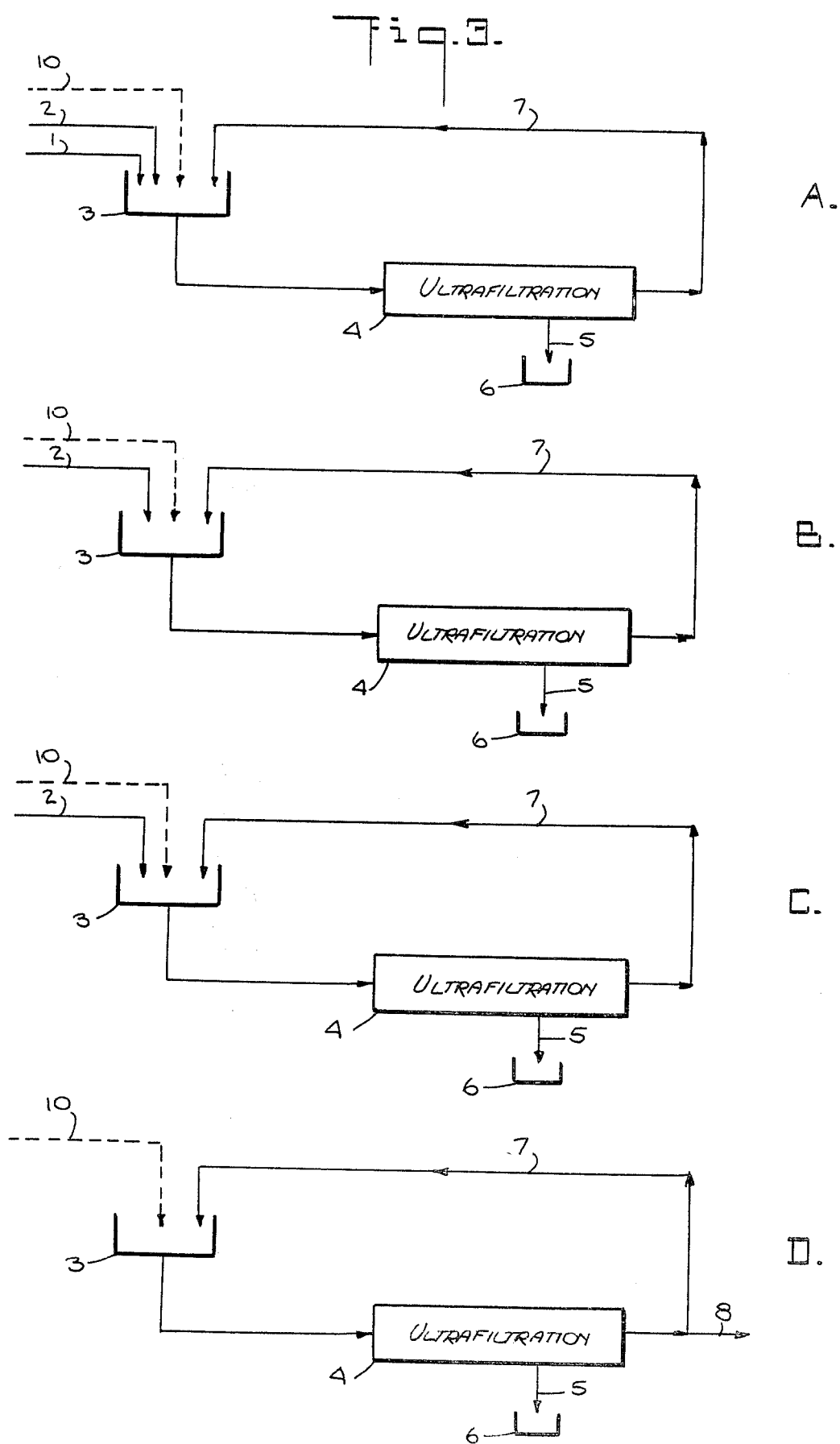

PROCESS FOR TREATING CARAMEL COLORS

BACKGROUND OF THE INVENTION

The present invention relates to a process for treating caramel colors and, more particularly, to a process for treating caramel colors to prepare caramel color concentrates.

Caramel colors are widely-used colorants which are prepared commercially from food grade nutritive carbohydrate sweeteners (glucose and fructose and/or polymers thereof, e.g., sugar, corn-syrup and starch hydrolyzates) by controlled heating of these materials to generate desired degrees of unsaturation, polymerization and color. For most food or beverage-grade applications, the preparation processes are augmented or catalyzed by the addition of ammonia, sulfite or combinations thereof. An identity scheme proposed by the International Technical Caramel Association (ITCA) classifies caramel colors according to four general "Classes", based upon whether ammonia and/or sulfite are employed in their preparation (and the nitrogen and sulfur content resulting therefrom) and ten specific "Types" based upon their color intensity, as shown in Table I.

The coloring properties of caramel colors are substantially attributable to the presence therein of high molecular weight materials commonly referred to as "color bodies". Caramel colors also contain a variety of low molecular weight materials which are largely devoid of any particular beneficial function with respect to the coloring properties of caramel colors but may contribute to some degree to the flavor, stability and foaming properties of caramel colors.

Each of the described processes exhibits its own particular disadvantages in the context of the desired objective, i.e., in producing caramel colors of increased coloring power. For example, some recommended treatments are difficult to practice on a practical, commercial scale involving significant quantities of materials and rapid throughputs through required equipment and operations. More importantly, however, the products of these processes, although containing concentrated amounts of colorant materials, do not necessarily retain the desirable properties present in the parent caramel color.

SUMMARY OF THE INVENTION

According to the present invention, a process is provided for the treatment of caramel colors for the purpose of preparing a caramel color concentrate therefrom based upon the treatment of caramel color by ultrafiltration at conditions designed not only to increase the concentration of color bodies but also to preserve and maintain all the desirable functional properties of the parent caramel color. In particular, the process of the present invention provides for the treatment of caramel color by ultrafiltration wherein the pH and/or ionic strength of the caramel color or a portion thereof is regulated in a manner which, inter alia, enhances the operability and efficiency of the process and reduces or prevents the loss or substantial decrease in the many desirable functional properties of the parent caramel color.

As is known in the art, ultrafiltration is a process by which a sample can be treated to separate materials of relatively high molecular weight from those of lower molecular weight. The process normally encompasses

TABLE 1

| | \multicolumn{6}{c}{CLASSIFICATION OF CARAMEL COLORS (PROPOSED)} |
|---|---|---|---|---|---|---|---|---|---|---|
| Class No. | I | | II | III | | | IV | | | |
| Class Name | Caramel Color, Plain | | Caramel Color, Caustic sulfite process | Caramel Color, Ammonia process | | | Caramel Color, Sulfite ammonia process | | | |
| Class Code | CP | | CCS | AC | | | SAC | | | |
| Use of ammonia | − | | − | + | | | + | | | |
| Use of sulfite | − | | + | − | | | + | | | |
| Total N, % | <0.1 | | <0.1 | ≧0.1 | | | ≧0.1 | | | |
| Total S, % | <0.1 | | ≧0.1 | <0.3 | | | ≧0.3 | | | |
| Type | CP-1 | CP-2 | CCS | AC-1 | AC-2 | AC-3 | SAC-1 | SAC-2 | SAC-3 | SAC-4 |
| Color Intensity* | 5-35 | 40-80 | 40-80 | 60-90 | 100-140 | 150-200 | 35-70 | 75-100 | 105-150 | 210-270 |

*of an 0.1% w/v solution at 610 nm in a 10 mm cell

The prior art evidences attempts to treat caramel color to separate its color-contributing materials from its non-colorant materials and thereby obtain a concentrated product which, in addition to its decreased weight and volume, possesses increased coloring or "tinctorial" power, i.e., as compared to untreated caramel colors, less caramel color concentrate need be utilized to obtain a particular level or intensity of color in a product. The methods proposed for this purpose seek, in particular, to isolate the color bodies from caramel colors. Thus, for example, U.S. Pat. Nos. 2,533,221; 2,637,655 and 2,902,393 describe processes wherein coagulating and precipitating agents are added to caramel colors to isolate caramel color concentrates high in color bodies; U.S. Pat. No. 2,701,768 discloses a process utilizing dialysis to remove non-color materials from caramel color; and U.S. Pat. No. 3,249,444 discloses a process utilizing ultrafiltration to separate the color bodies of caramel colors from non-color materials.

placement of a solvent (e.g., water) solution of the sample on one side (retentate side) of a semi-permeable membrane sized so as to retain materials in the sample above a particular molecular weight but allow the passage, with solvent, of those below a particular molecular weight. Hydrostatic or hydrokinetic pressure is applied to the sample solution, and continuous or periodic addition of solvent to the sample solution allows the ultrafiltration to continue for a time sufficient to reach a theoretically high degree of removal of permeable materials from the sample.

In theory, ultrafiltration of caramel color should result in a useful caramel color concentrate since, for caramel colors, the high molecular weight materials which do not permeate through the semi-permeable membrane in fact constitute a large portion of the materials responsible for the coloring properties of caramel color whereas those materials which do permeate constitute a large portion of the non-colorant materials. In practice, however, it has been found, for example, that certain types of caramel colors are not capable of being processed at all by application of known ultrafiltration techniques; that ultrafiltration of certain caramel colors to prepare a caramel color concentrate, to the extent possible at all, typically proceeds at uneconomically slow rates; that preparation of color concentrates of high concentration is attainable only at very slow rates; and that known ultrafiltration techniques are inadequate for preparing a caramel color concentrate where it is desired that the concentrate be substantially devoid of all (or particular) low molecular weight materials. More importantly, caramel color concentrates prepared by ultrafiltration do not necessarily possess the desirable functional characteristics and properties of the starting caramel color.

According to the present invention, it has been found that each of the foregoing disadvantages encountered in attempting simply to apply known ultrafiltration techniques to caramel colors can be overcome to a substantial degree by attention to the pH and/or ionic strength of the caramel color during ultrafiltration.

The process of this invention involves the following steps performed in either a continuous, semi-continuous or batch manner:

(a) subjecting a mixture of caramel color and water to ultrafiltration through a semi-permeable membrane to yield a permeated fraction passing through the membrane and a retained fraction, which does not pass through the membrane, comprised of high molecular weight color bodies and water, the latter in an amount reduced from that present in the original mixture of caramel color and water;

(b) adding water to the retained fraction and subjecting the resultant mixture to ultrafiltration through a semi-permeable membrane to yield a permeated fraction passing through the membrane and a retained fraction, which does not pass through the membrane, comprised of high molecular weight color bodies and water, the latter in an amount reduced from that present in the resultant mixture; and (c) subjecting the retained fraction of step (b), without any significant addition of water thereto, to ultrafiltration through a semi-permeable membrane to yield a permeated fraction which passes through the membrane and a retained, product fraction, which does not pass through the membrane, comprised of high molecular weight color bodies and water, the latter in an amount reduced from that present in the retained fraction of step (b).

In the process of this invention, the pH and/or ionic strength of the starting caramel color solution or one or more of the retained fractions resulting from ultrafiltration is regulated so as to result in a caramel color concentrate which substantially retains the desirable functional attributes of caramel colors. In addition, regulation of the pH and/or ionic strength of the caramel color may be utilized as a means for, inter alia, improving the rate of the overall ultrafiltration process and for producing caramel color concentrates substantially free of all or of particular low molecular weight materials.

As used hereinafter, "caramel color concentrate" is intended to refer to the retained, product fraction of step (c) above. In fact, however, the "retained fraction" resulting from practice of steps (a) or (b) above is literally a caramel color concentrate and may be utilized to advantage as such with or without further non-ultrafiltration concentration and/or drying. As discussed in further detail hereinafter, subjecting these retained fractions to the further processing in step (c) to obtain a retained, product fraction offers advantages in the overall processing and, particularly, in affording non-degradative means for obtaining further concentration. As such, utilization of step (c) constitutes a most preferred manner of processing and is emphasized hereinafter.

The regulation of pH and/or ionic strength of caramel color or retained fractions thereof according to the present invention typically will involve some adjustment of these parameters as found in the commercially available caramel colors utilized as starting materials. In certain instances, however, it may be possible simply to utilize available caramel colors as the starting materials herein which, as a result of the choice thereof in accordance with the guidelines disclosed in the present invention, do not require overt alteration of their pH and/or ionic strength in order to function effectively and result in a high quality caramel color concentrate.

According to specific embodiments of the present invention, the pH of caramel color subjected to ultrafiltration is regulated at the commencement of and throughout the process in order to render the process "mechanically" feasible and practical, i.e., in order to render the caramel color capable of being processed by ultrafiltration to achieve separation of high and low molecular weight materials. In another embodiment, the pH of caramel color is regulated at at least one point during the process, including, if necessary, at the commencement of and throughout the entire process, in order to insure that the caramel color concentrate produced exhibits color, solubility, foaming, stability and other properties (e.g., salt tolerance; tannin resistance) substantially the same as that of the starting material so as to render the concentrate useful for all purposes and to substantially the same degree as compared to caramel colors. A further specific embodiment involves the regulation of the ionic strength of the caramel color, typically of retained fractions thereof produced in later stages of the ultrafiltration process, to improve the rate at which materials (e.g., low molecular weight materials and water) are removed therefrom. In yet another embodiment, the ionic strength of caramel color or of a retained fraction thereof is regulated during ultrafiltration to enhance the removal to a high degree of all or particular low molecular weight materials therefrom.

With respect to the ultrafiltration process per se, the steps or stages described earlier as (a), (b) and (c) constitute the fundamental operating procedure for the process, in the context of which pH and/or ionic strength regulation and/or adjustment is utilized.

The various ultrafiltration processes of steps (a), (b) and (c) may be performed in the same apparatus containing the semi-permeable membrane, i.e., simply by recycling of the retained fraction from each step through the same apparatus in which it was generated. However, the various retained fractions can, in one or more of the above steps, be subjected to ultrafiltration through different physical apparatus containing either the same or different semi-permeable membranes.

In the practice of the present invention, where water is added batch-wise to the caramel color for ultrafiltration, the process of step (b) may be repeated one or more times by addition of additional batches of water prior to practice of step (c). Thus, the retained fraction resulting from the first practice of step (b) will again be diluted with water and subjected to ultrafiltration. The resulting retained fraction can then be subjected to the process of step (c), i.e., ultrafiltration without any significant initial dilution, or alternatively, subjected to still further repeated practice of step (b) before the final ultrafiltration of step (c).

The final step, i.e., step (c) of the process of this invention, although generating some degree of removal of low molecular weight materials in the permeated fraction, is primarily designed to remove water, i.e., to concentrate the retained fraction from the previous steps, in a non-degradative manner. As such, it is undesirable to add any water to the retained fraction for processing in this final step since this will limit the amount of concentration that can be accomplished. It is possible, of course, to add some water to the retained fraction for practice of this final concentration step, e.g., in an amount significantly less than that added in the practice of step (b), but there is little economic or practical justification therefor.

In accordance with one particular embodiment of the present invention, the pH of the caramel color is regulated so as to enable the use of ultrafiltration as a means for isolating high molecular weight materials from the caramel color thereby forming a caramel color concentrate. By way of example, it has been found that a solution of commercially available Type CP-1 caramel color having a pH of about 3.25, when subjected to ultrafiltration at conditions of temperature, pressure, membrane type and porosity, etc. found workable for other type caramel colors, processed so slowly as to be totally impractical to achieve any useful separation of high and low molecular weight components. However, when the solution of this caramel color was raised to a pH of about 7.1 at the commencement of processing, and substantially maintained in the pH range of from about 6.5 to about 7.1 during the entire ultrafiltration process, the rate of ultrafiltration rose significantly and an effective isolation of high molecular weight materials was obtained. The caramel color concentrate produced in this manner was of excellent quality with respect to all desirable functional properties as compared to the parent caramel color. Surprisingly, although the caramel color originally was functional at its pH of 3.25, readjustment of the pH of the caramel color concentrate product produced by ultrafiltration to this pH adversely affected the functionality of the concentrate. Maintaining the color concentrate at about pH 7.0 and above resulted in retention of its desirable functional properties, even if the sample was dried, by freeze-drying, before evaluation.

The regulation and/or adjustment of pH may also be utilized with respect to other Type caramel colors to ensure that desired functional properties of the parent caramel color are carried through to the concentrated product resulting from ultrafiltration. For example, the pH of solutions of Class II and III caramel colors can be adjusted at the commencement of the ultrafiltration process to ensure that the caramel color concentrate produced therefrom possesses the clarity characteristics of the parent caramel colors when dissolved in liquid products. For Class IV Caramel Colors, the pH of solutions thereof may, for example, be regulated so as to produce a caramel color concentrate possessing the salt tolerance exhibited by the parent caramel.

According to another embodiment of the present invention, it has been found that the addition of one or more ionic materials to the caramel color solution or to some retained fraction thereof produced during ultrafiltration assists the rate of ultrafiltration in the last stage (i.e., step (c) above) of the overall process. Thus, it has been found advantageous to provide the caramel color solution or retained fraction with added materials, sufficient to bring about an increase in the ionic strength thereof, at least in the final, concentration stage of the process, i.e., where the retained fraction is subjected to ultrafiltration without any water addition. If these materials are not added, the rate of water removal, by ultrafiltration, from the retained fraction is slow. To bring about the desired concentration at these slow rates, the retained fraction might, therefore, have to be processed at ultrafiltration conditions for a lengthy period of time during which degradative reactions might occur. The alternative, i.e., concentrating by conventional techniques (e.g., evaporative or freeze-concentration), adds additional, expensive unit operations to the process which might result in colorant degradation or loss of functionality.

To avoid this undesirable effect, ionic materials preferably are added to a retained fraction produced during ultrafiltration. The success of this manner of processing is theorized to result from the fact that the high molecular weight color bodies from caramel colors normally contain charged groups or moieties. These charges are normally satisfied by the ionic materials, e.g., salts, typically present in all commercially-prepared caramel. However, these small ionic materials are permeable through the semi-permeable membrane used in ultrafiltration. as ultrafiltration continues, the concentration of such small ions in the retained fraction decreases to a point where they are insufficient in number to serve as counterions and thus to satisfy the charges on the caramel color bodies. The charged color bodies, therefore, are believed to link or associate in ionic bonds with each other, presenting the semi-permeable ultrafiltration membrane with a highly viscous, bonded layer thereover which significantly impedes the passage through the membrane of water and other low molecular weight materials. The addition of ionic materials appears to satisfy the requirement of counterions for the charges on the color bodies and prevents their association, thus permitting water removal during ultrafiltration to occur at acceptable rates and up to higher color body concentrations.

The minimum requirement of the process according to this embodiment of the invention is the presence of added ionic materials in the retained fraction which is being subjected to ultrafiltration primarily for the purpose of concentration of such fraction, i.e., where little or no water is being added to the retained fraction prior to ultrafiltration. As such, it is generally preferred to add the requisite ionic materials to the retained fraction resulting from the last ultrafiltration of retained fraction with added water (e.g., the last operation of step (b), above). It also is possible, however, to add these ionic materials at earlier stages of the overall process such that they will be present, as required, in the retained fraction subjected to ultrafiltration without added water for concentration purposes. However, since the ionic materials pass from the retained fraction to the permeated fraction during ultrafiltration, ionic materials added in earlier stages of the process would have to be added in amounts such that there are still sufficient quantities thereof present in the retained fraction in the final, concentration stage of the process. This may result in undesirably uneconomical utilization of such ionic materials and the undesirable presence of large quantities of ionic materials in the permeated fractions resulting from ultrafiltration.

Regulation and/or adjustment of the pH and/or ionic strength of caramel color solutions or retained fractions thereof produced during ultrafiltration may also be employed according to an embodiment of this invention where it is desired to produce a caramel color concentrate having a very low content of low molecular weight materials. Thus, for example, it has been found that some low molecular weight materials in caramel color, despite being of a size such that they theoretically should be fully permeable through the semi-permeable membranes utilized in ultrafiltration, do not, in practice, appear in the permeated fraction at the expected level. Experiments on certain caramel colors have shown that a decrease in the retention of these low molecular weight materials in the retained fraction can be achieved by addition to the solution of caramel color (or to any retained fraction thereof resulting from ultrafiltration) of materials sufficient to result in a pH of the solution or fraction of from about 1.0 to 2.5 prior to or while subjecting the solution or fraction to ultrafiltration. It is theorized that these low molecular weight materials form a complex or association of some type with the color bodies of caramel colors that thereby prevents the low molecular weight materials, despite their small size, from passing through the semi-permeable membrane during ultrafiltration. The pH adjustment is believed to weaken or break the complex or association such that these low molecular weight materials are free to permeate in the expected manner.

The foregoing findings appear to be not unlike those made by researchers at Kobe University wherein it has been reported that addition, prior to ultrafiltration, of either sulfuric acid (to pH 2.0) or sodium hydroxide (to unspecified pH) to highly diluted caramel color solutions, apparently made from SAC-2 sulfite ammonia caramel color, results in removal of the low molecular weight substance, 4-methylimidazole, more nearly approximating expected theoretical values than that achieved in the case where no pH adjustment is utilized. See Kishihara, et al., "Removal of Imidazoles From Caramel Color By Ultrafiltration", Kagaku-Kogaku Ronbunshu, 2, 445 (1976); Komoto, et al., "Quality Improvement Of Edible Caramel Colors By Membrane Treatment", Seitogikenshi, 27, 24 (1977); Fujii, et al., "Ultrafiltration of Caramel Color", Nippon Shokhin Kogyo Gakkaishi, 24, 236 (1977); Kishihara, et al., "Release Of Bound Imidazoles In Caramel Color", Nogeikagaku Kaishi, 53, 273 (1979); Kishihara, et al., "Preparation Of Imidazole-Free Caramel Color Through Hollow Fiber Module Ultrafiltration", Ibid., 53, (1979). However, an additional highly significant finding of the present invention is that the desirable increase in the removal of otherwise permeable low molecular weight materials brought about by the low pH conditions mentioned may also be accomplished simply through the addition to a caramel color solution or a retained fraction thereof of materials which increase the ionic strength of the solution or fraction but which do not significantly affect the pH. Thus, this effect may be achieved without adversely affecting functionality since the benefit is obtained at a pH at which the functionality is maintained during ultrafiltraion. An additional important finding of the present invention in this regard is the ability to effect removal of these otherwise permeable low molecular weight materials, using the noted pH and/or ionic strength adjustment, from caramel color solutions not nearly so dilute as those employed in the known pH adjustment process earlier referred to.

As will be apparent from the foregoing discussion, attention to the pH and/or ionic strength of caramel colors during ultrafiltration provides a means for bringing about a number of desirable changes in the processing per se or in the caramel color concentrate produced thereby, and that the means for achieving these desired results may be combined or coordinated in manners which are designed to maximize beneficial results.

By way of example, the use of the process of this invention to increase the rate of removal of water and low molecular weight materials from the retained fraction being subjected to ultrafiltration in the final stage of the process, i.e., where no water addition is made to the retained fraction, requires, at a minimum, that the ionic strength of the retained fraction being so treated be at a particular level during this concentration stage. The ionic strength value of this retained fraction may be affected both by materials which affect the pH thereof and by materials having little or no effect on the pH (e.g., buffer salts). Moreover, the achievement of a particular ionic strength value in this retained fraction may be brought about, for example, either by choice of an appropriate starting caramel color solution or adjustment of the ionic strength of a retained fraction produced during ultrafiltration, giving due consideration to the fact that the ionic strength of any of these solutions might have to take into account an anticipated loss of ionic strength-affecting materials to the permeate fraction during ultrafiltration steps prior to the concentration stage.

These features introduce an important flexibility in the overall process which enables its coordination with other pH or ionic strength related advantages. For example, where the Type caramel color employed as the starting material is one wherein pH adjustment at the commencement of the ultrafiltration process is required in order to achieve separation of high and low molecular weight components to any practical degree, the materials added for this purpose may be found to provide the requisite ionic strength level in the concentration stage of the process which brings about increased rates of water removal in this stage. Alternatively, this same increased rate of water removal in the concentration stage of the ultrafiltration process may result from the increased ionic strength of the retained fraction at this portion of the process resulting from the addition of pH or ionic strength adjusting materials at an earlier part in the process for the purpose of either enhancing the removal of low molecular weight materials from the caramel color concentrate or insuring that functional properties of the parent caramel are carried through to the concentrate.

An additional benefit of the process of this invention is the compatibility of the means for achieving one or more desirable results during the ultrafiltration process. Thus, for example, one means for achieving increased removal of low molecular weight components involves the adjustment of the pH of the starting caramel color solution to a low level, and a means for achieving water removal rate increases during the concentration stages of the ultrafiltration process may also involve pH adjustment (to increase the ionic strength of the retained fraction being treated in the concentration stage). However, the pH adjustments for these purposes might be incompatible with the optimum pH range established to insure a good quality product having a functionality comparable to the parent caramel. The findings of the present invention with respect to the ability to achieve the former advantages not only by pH adjustment but also by addition of materials which increase the ionic strength but which do not materially affect pH, make possible the coordination of these processes to achieve all the particular advantages attendant therewith.

The conditions other than pH or ionic strength at which the process of this invention is performed are designed to maximize the rate of production of caramel color concentrate without damaging or otherwise altering its colorant function. In general, these conditions include average temperatures of the starting caramel solution or retained fractions thereof of from about 60° C. to about 90° C. during all phases of the process. Although ultrafiltration rates are increased with increasing temperature, operation at or above about 90° C. can cause degradation of the caramel color bodies if the process time is not adequately short. Operation below about 60° C., while in principle satisfactory, increases the possibility of microbial growth in the processing equipment and decreases the rate of processing.

In general, the pressure utilized during ultrafiltration will depend upon a number of factors such as the ultrafiltration unit employed, desired flow rates and the physical strength of the semi-permeable membranes or their supporting structure. For example, for a DDS-RO-Module 35 ultrafiltration unit ($9m^2$) equipped with GR-8-P (10,000 molecular weight cut-off) membranes, average pressures in the range of from about 40 to about 170 psig have successfully been employed, recognizing that pressure drops will necessarily occur between the inlet and outlet ports of typical ultrafiltration apparatus. In this apparatus, the rate of ultrafiltration generally will increase with increasing pressure; however, at inlet pressures above about 160–170 psig, the rate appears to become more nearly constant.

The semi-permeable membrane used for ultrafiltration is chosen such that, in general, materials having a molecular weight above about 10,000 are unable to pass through its pores. In general, it is desirable to have a membrane which will separate the higher and lower molecular weight components in a useful manner. In the case of caramel colors, much of the coloring components are above a molecular weight of about 30,000 whereas the components below about 2,000 are those of little color. Accordingly, a membrane with a cut-off of about 10,000 was selected for most of the studies shown in the Examples described hereinafter. As will be appreciated, however, the permeability of the membrane may be affected by other system parameters such as temperature, pressure, concentration, the specific product being treated, and the like. Thus, according to the process of this invention, both the particular semi-permeable membrane and the conditions of operation are selected so as to result in the desired exclusion of materials above a molecular weight of about 10,000. Selection of membranes or conditions which allow materials having molecular weights above 10,000 to permeate through the membrane will normally result in the undersirable increased loss of color bodies from the caramel. Alternatively, use of a membrane which has excessively small pores would result in too large a retention of low molecular weight components.

The conditions chosen for ultrafiltration to maximize to the degree possible the rate of removal of water and low molecular weight material affect parameters related to the flux through the semi-permeable membrane, i.e., the volume of material passing through a given area of the membrane per unit of time in relation to the retentate volume. The flux is affected by the concentration of the caramel (or retained fraction thereof) passing over the membrane, preferably maintained in the range of from about 15 to about 40% solids by weight, and the other conditions above-discussed, e.g., temperature and pressure as well as the earlier-described effect of pH and/or ionic strength on the flux.

The process of the present invention provides a means for producing a caramel color concentrate rich in non-degraded color bodies yet still possessing the non-color related functional attributes of the parent caramel color. These caramel color concentrates resulting from ultrafiltration possess obvious advantages with respect to their decreased bulk and increased coloring power, the ease and effectiveness of measures for stabilizing such products against microbiological contamination, decreased costs in connection with drying the concentrate to powder form and ease of adjustment of the concentration to provide a wide range of color intensity for particular products.

The foregoing advantages of caramel color concentrates are attainable according to the present invention where a significant degree of removal of low molecular weight (i.e., non-colorant) materials (and water from the starting caramel color solution is obtained in the ultrafiltration process. In addition, however, it may be desirable to perform the process such that the caramel color concentrate meets a more stringent requirement, i.e., wherein it is substantially devoid of particular or all low molecular weight materials. The process of the present invention enables the attainment of this criterion by means earlier discussed. The resultant concentrate obviously possesses to an even greater degree the advantages of concentrates per se along with the additional property of freedom from low molecular weight materials. Significantly, the process of this invention enables the production of concentrates substantially devoid of low molecular weight materials yet which still possess the desirable related functional properties of the parent caramel color.

BRIEF DESCRIPTION OF THE FIGURES

FIG. 2A through 2D constitute a schematic flow sheet of the overall process of the present invention with individual stages of the process divided for ease of reference.

FIG. 3A through 3D constitute a schematic flow sheet of a particular embodiment of the present invention.

DETAILED DESCRIPTION OF THE INVENTION

The fundamental operating scheme of the process of the present invention is described in detail hereinafter with the aid of the appended figures.

Figure 1:
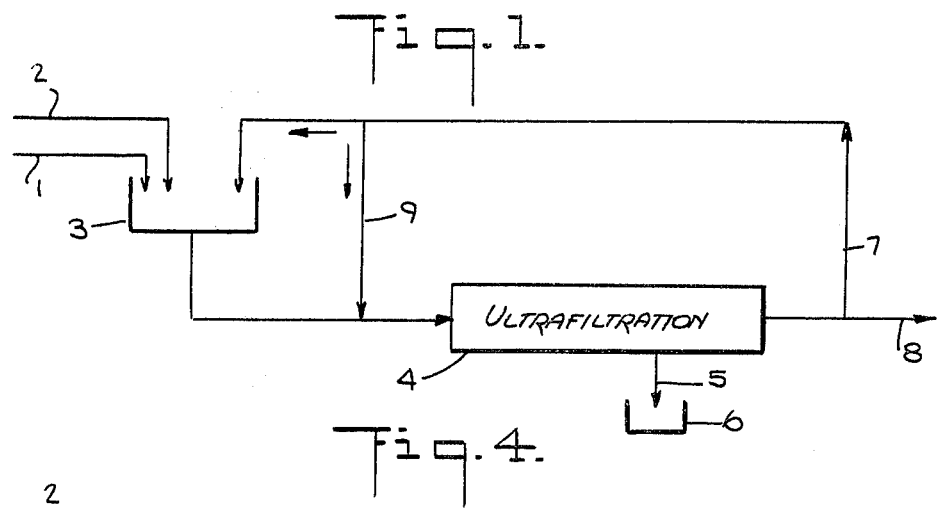
FIG. 1 is a schematic flow diagram of the overall process of this invention.

Referring to FIG. 1, a commercial caramel color 1 and water 2 are added to a vessel 3 to form a batch of diluted caramel solution having a solids content of from about 15 to about 40% by weight, preferably above about 20% by weight. The diluted caramel solution then is passed through the ultrafiltration unit 4 where it is divided into a permeated fraction, which passes through the semi-permeable membranes in the ultrafiltration unit in line 5 to collection vessel 6, and a retained fraction which does not pass through the membranes.

The retained fraction is circulated through line 7, partially to the original holding vessel 3 and partially directed by line 9 again through the ultrafiltration unit 4, with some liquid from vessel 3. The more of the retained fraction that is diverted to line 9, the higher the operating pressure can be whereas the more that is diverted to vessel 3, the more thorough the mixing of the total solution. During such recirculation, no additional caramel or water need be added to the system. After a number of such recirculations, the retained fraction, which now has lost much of its original water content to the permeated fraction, is then mixed with additional water in vessel 3 and the overall recirculation continued until a predetermined amount of permeate is removed. The retained fraction resulting from this recirculation, having decreased quantities of water and low molecular weight solids which have passed to the permeated fraction, may again be diluted with additional water and subjected to ultrafiltration using a number of recirculation passes. After a given number of these dilutions with additional water and ultrafiltration have been performed (or alternatively, recirculation while water has been continuously added to the retained fraction, generally at a rate equal to the rate at which permeate has been removed, so as to keep the volume constant, as in FIG. 4), the retained fraction is permitted to recirculate through the ultrafiltration unit with no further addition of water thereto. In this manner, additional permeate is removed and a concentrated retained product fraction is produced and drawn-off at line 8 having decreased quantities of water and low molecular weight materials.

FIGS. 2A through 2D show the above process split into the various recirculation stages for ease of description. Thus, in the first step (FIG. 2A), caramel 1 and water 2 are mixed in vessel 3 and passed through ultrafiltration unit 4. The retained fraction 7 resulting from this ultrafiltration is recirculated through line 9 and/or vessel 3 (without addition of water) to ultrafiltration unit 4 until a predetermined amount of water with low molecular weight solids are lost from the caramel to the permeated fraction 5 and collected in vessel 6.

After this process, water is added to the retained fraction (FIG. 2B) and the circulation through the ultrafiltration unit conducted as described above. In the preferred practice of this invention, the ultrafiltration unit utilized in these various steps of the process (FIGS. 2A through 2D) is the same single unit. It is, however, possible to utilize separate ultrafiltration units for any one or more of the steps shown.

After a pre-determined amount of permeate has been collected without addition of water, the retained fraction from the step shown in FIG. 2B, that has now lost water and further low molecular weight materials to the permeated fraction 5, is diluted again with water (FIG. 2C) and processed as described above for FIG. 2B. Finally, the retained fraction 7 resulting from this step (FIG. 2C) is continuously circulated through the process (FIG. 2D), with no further addition of water, to effect concentration of the retained fraction and further removal of low molecular weight materials to the permeated fraction. After sufficient concentration and removal of low molecular weight components has occurred, the retained product fraction is taken off, for example, at line 8.

A particular embodiment of the process of this invention, involving the addition of ionic materials in the process to bring about increased rates of concentration of the retained fraction in the final stage of the process, is shown in FIGS. 3A through 3D. As earlier noted, the minimum requirement for this process is the presence of added ionic materials in the retained fraction being subjected to ultrafiltration in the final stage of the step process (FIG. 3D), i.e., in the primarily concentration stage of the process. This presence of added ionic materials can be accomplished by addition of such materials through line 10 to the retained fraction at the later stage of the step shown in FIG. 3C or the beginning of the final stage (FIG. 3D), e.g., after the final addition of water has been made to the retained fraction (beginning of process stage shown in FIG. 3C) and a given removal of permeate from the thus diluted retained fraction through the unit has occurred. Thus, ionic materials will be added through line 10 in FIG. 3D or FIG. 3C (some time after water has been added to the retained fraction through line 2 in FIG. 3C).

Although it is possible to accomplish the desired presence of added ionic materials in the retained fraction undergoing concentration by addition of ionic materials earlier in the overall process, the loss of such added ionic materials to the permeated fraction during these earlier passes through the ultrafiltration unit will require that significant quantities of ionic materials be added in order to insure that, after losses to the permeated fraction, sufficient amounts thereof are present at the desired later point in the process. (Ionic species that are not freely permeable (e.g., of high molecular weight) might be added (or generated in addition to those already present by modification to the caramelization process) and thereby alleviate the problem of waste of the ionic species in the permeate). This addition at an early stage is not generally considered economical unless, as earlier noted, other benefits, such as increased removal of otherwise difficulty-permeable or impermeable low molecular weight materials and/or maximum retention of functional properties of the caramel color are obtained. Thus, ionic materials in sufficient quantities can be added through line 10 in FIG. 3A or 3B as shown. Of course, it is possible to add a quantity of ionic materials early in the process sufficient to achieve a first objective (e.g., increased removal of low molecular weight materials) and then a second quantity of ionic materials in a later stage to achieve a second objective (e.g., increased concentration rates).

In another particular embodiment, pH adjusting materials may be added at the commencement of the process in order to insure maximum retention of functional properties of the caramel color. The presence of such materials may yield other advantages earlier noted throughout or in later stages of the process. Alternatively, additional pH and/or ionic strength materials can be added at appropriate stages to achieve these other advantages.

Figure 4:
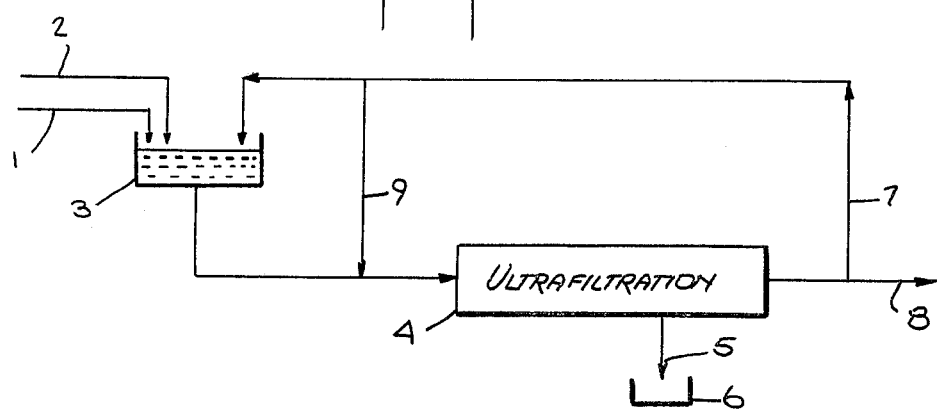
FIG. 4 is a schematic flow sheet of the overall process utilizing continuous water addition during much of the process.

As noted earlier, the process for adding water can be done on a continuous basis, wherein, in FIG. 4 water is added at line 2 so as to maintain a constant volume in tank 3. After the desired degree of removal of low molecular weight materials has been removed, the retained solution can be concentrated, as in FIG. 2D or FIG.

3D. In fact, in order to optimize the rate of processing or to minimize the volume of permeate, or for other reasons, the water might be added at such a rate as to give a slowly changing retained fraction volume and/or the batch and continuous water addition processes might be combined.

Figure 5:
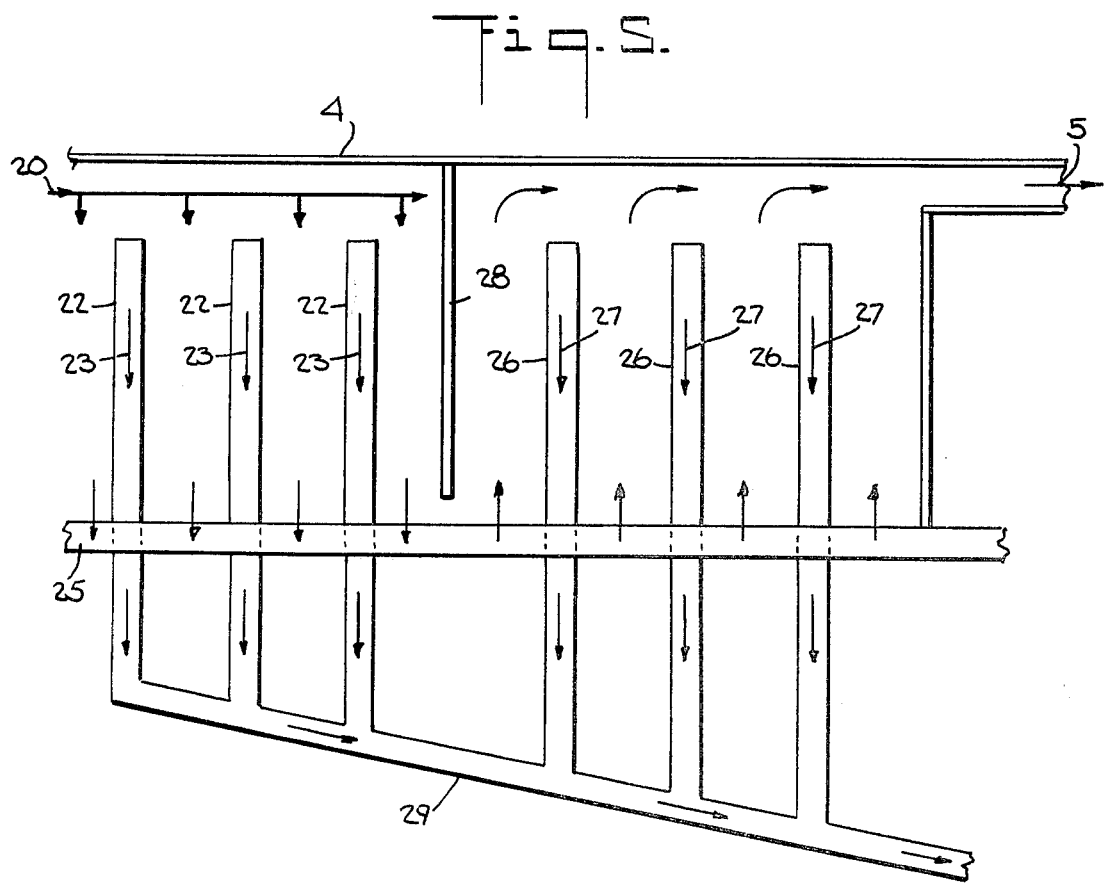
FIG. 5 is an enlarged section of a typical ultrafiltration unit utilized in the process of the present invention.

FIG. 5 is a longitudinal section through a typical membrane ultrafiltration apparatus which illustrates the flow of the caramel solution (or a retained fraction thereof from an earlier ultrafiltration) over the semipermeable membranes. Thus, a solution of caramel color, as an example, enters the ultrafiltration unit 4 through line 20 and passes downward past a first group of spaced-apart, parallel, semi-permeable membranes 22. Materials from the solution which permeate the membranes pass into recess channels 23 and are collected in tubes that lead to channel 29. Impermeable retained materials pass to channel 25 and then upward past a second series of semi-permeable membranes 26. The second series of membranes is separated from the first series by a solid retaining plate 28. Again, materials which permeate the membrane pass into recess channels 27 and are collected in the tubes that lead to channel 29. The remaining impermeable materials exit the ultrafiltration unit at 5 for collection.

The foregoing is merely illustrative of one form of apparatus which can be employed in carrying out the ultrafiltration process of the present invention. Many other units of differing design capable of achieving the desired ultrafiltration are commercially available.

Further details with respect to the present invention are provided with reference to the following illustrative examples.

EXAMPLE I

A series of experiments was conducted to investigate the effect of pH adjustment and ionic strength alteration on the ultrafiltration of caramel color.

Three runs were conducted utilizing the same caramel color feedstock (Type SAC-4). The caramel color for each run (348 pounds) was diluted with 360 pounds of salt dechlorinated water to a volume of about 77 gallons and subjected to a five-stage ultrafiltration process at 60° C. through a DDS-RO-35 ultrafiltration unit utilizing GR-6-P membranes having a stated molecular weight cut-off of 25,000. In the first stage, the caramel color/water mixture was ultrafiltered until 465 pounds (51.5 gallons) of permeate was collected. Water, 25.5 gallons (a volume equal to that of the retentate), was then added to the retentate and the resultant mixture ultrafiltered until 25.5 gallons was collected. The retentate from this process was again mixed with 25.5 gallons of water and ultrafiltered until 25.5 gallons of permeate was collected. In the fourth stage, 25.5 gallons of water was again added to the retentate and this was ultrafiltered to remove the 25.5 gallons of water. In the fifth stage, ultrafiltration was continued, without further addition of water, to remove 9.5 gallons of permeate to give a final volume of 16 gallons. Based on equations for calculating the removal of totally permeable low molecular weight materials, 97.5% of these materials would have been removed.

The control run (Run No. 42) was conducted according to the above scheme. In Run No. 46, the pH of the retentate/water mixture was adjusted to pH 8.5 by addition of 3.25 liters of 50% NaOH solution at the start of the second stage. It remained at pH 8.5 throughout the second and third stages, and was re-adjusted back to pH 3.3 with 1.75 liters of 85% phosphoric acid prior to the commencement of the fourth stage. In Run No. 48, the ionic strength of the retentate was raised at the start of the fourth stage by addition of 7.71 pounds $NaH_2PO_4$. This was calculated to give the same ionic strength which was present at the start of this stage when the pH was adjusted as in Run No. 46.

The DDS unit has 120 membranes on 60 plates and provides 9 $m^2$ of membrane area. The flow pattern through the membrane stack is such that there are three sets of 40 parallel membranes in series. The process pressures were 114 psig inlet and 43 psig outlet, with the outlet pressure rising to 54 psig toward the end of the run. The flux started at 260 gph, dropped to 35 gph at the end of the first concentration stage, gradually rose to 290 gph at the start of the final concentration stage and then dropped to 20 gph at the end of the final concentration stage.

The results of these runs as shown in TABLE II reveal that ionic strength adjustment or pH adjustment result in faster processing especially due to descrease of the time in the final stages.

In laboratory measurements on caramel and retentate, it was determined that the decreased processing time noted for Run No. 46 was not due to a lowering of the viscosity of the retentate through addition of ionic material, since viscosity measurements on retentate plus various amounts of $NaH_2PO_4$ up to the level used in run 48 showed up to about a 5% increase in viscosity.

Portions of retentate from each run were freeze-dried on a Virtis-Repp FFD-15 freeze drier with a shelf temperature of about 25° C. and a condenser temperature of −50° C. or lower for 48 hours to give dark, powdered color concentrates.

TABLE II

| | PROCESSING TIME (min.) FOR EXAMPLE I | | | | | |
|---|---|---|---|---|---|---|
| RUN NO. | STAGE 1 | STAGE 2 | STAGE 3 | STAGES 1-3 | STAGES 4 & 5 | STAGES 1-5 |
| 42 (Control, pH 3.3) | 32 | 15 | 16 | 63.5 | 80 | 143 |
| 46 (pH 8.5) | 28 | 13 | 12 | 53 | 20 | 73 |
| 48 ($NaH_2PO_4$, pH 3.3) | 24 | 10 | 9 | 43 | 17 | 60 |

EXAMPLE II

A series of experiments was carried out to demonstrate further the usefulness of increasing the ionic strength of the caramel color retentate in order to increase the permeate flux (decrease the processing time) and to increase the maximum concentration of solids that is conveniently achieved during the final, concentration stage.

Two control and three experimental runs were conducted utilizing the same lot of caramel color feedstock (Type SAC-4). The caramel color for each run (348 pounds) was diluted with 360 pounds of soft dechlorinated water to about 77 gallons and subjected to a three-stage ultrafiltration process at 60° C. in a DDS-RO-35 ultrafiltration unit (9 m$^2$) utilizing GR-8-P membranes having a stated molecular weight cut-off of 10,000. In the first stage, the volume of the diluted caramel color was reduced to about 51.2 gallons by ultrafiltration by removing 231 pounds of permeate. In the second stage, water was added and permeate was continuously removed so as to maintain the retentate at constant volume while 1827 pounds of permeate was collected. Finally, the water addition was stopped and an additional 307–320 pounds of permeate was collected to reduce the retentate volume to about 16 gallons. In the experimental runs, 7.71 pounds of NaH$_2$PO$_4$ was added at the start of the concentration phase. In all cases, the permeate flux and the solids concentration were measured at regular intervals during the concentration phase. When the permeate flux as a function of solids concentration is plotted, it can readily be seen that the addition of NaH$_2$PO$_4$ gives a higher permeation rate at any given solids concentration and allows attainment of a higher maximum solids concentration. In situations where higher color concentration is essential, such as when a highly colored final product is needed, either as a liquid color concentration or one which is to be stabilized against microbiological spoilage by mixture with corn syrup solids to give a high total solids concentration and a high color concentration. The process of this invention may be used to alleviate the need for a separate unit operation, such as an evaporation stage, for obtaining the desired final product.

The effect is also seen as the time required to collect 312 pounds of permeate in the concentration phase and the flux at that point, as shown in Table III below.

TABLE III

SUMMARY OF RESULTS FROM EXAMPLE II

| Experiment No. | Time To Collect 312 pounds permeate (minutes) | Final Flux, liters/min. |
| --- | --- | --- |
| 197 (Control no ionic additives) | 24 | 1.0 |
| 200 (Control no ionic additives) | 22 | 1 |
| 196 (Experimental) | 17 | 2 |
| 199 (Experimental) | 19 | 1.5 |
| 205 (Experimental) | 16 | 1.5 |

EXAMPLE III

A series of experiments was conducted to examine further the effect of pH adjustment on the rate of ultrafiltration as observed in Example I, especially at relatively high solids concentrations in the retentate, and to examine the Komoto observation on the relationship of pH to 4-MeI removal.

In the manufacture of commercial SAC caramel colors, the final pH may be 2.0 or lower. This pH is frequently raised immediately after manufacture to about 3.0 or so with alkali such as sodium hydroxide solution. Raising the pH may be done to meet a specific requirement of a user. It is well known in the trade that this pH adjustment will give somewhat improved storage stability of the caramel color, for instance it may be stored at a given temperature for a longer time without developing an increased tendency to form haze. A number of experiments were, therefore, carried out at different pH's and different levels of added ionic strength, with an SAC-4 caramel color that had been left unadjusted by the manufacturer (pH=2.35).

To 149 pounds of caramel color feedstock (Type SAC-4, whose pH was 2.35 from the manufacturer; solids, 50% by weight; absorbance, 0.320 at 560 nm (0.1% w/v dilution)) was added 250 pounds of soft dechlorinated water to a volume of about 45 gallons. This solution was warmed to 60° C. and ultrafiltered on a DDS-RO-Module 35 ultrafiltration unit (9 m$^2$ membrane area) at constant volume (warm water was continuously added at the same rate at which permeate was being removed) collecting 1860 pounds of permeate (approx. 221 gallons). The process pH's are given in Table IV. The retentate was then concentrated by ultrafiltration in the absence of any further water addition by removing 224 pounds of permeate. The pH of the retentate was adjusted to 3.0 to 3.2, either before or after the concentration stage, with 50% NaOH. A portion was freeze-dried on a Virtis-Repp FFD-15 freeze drier with a shelf temperature of about 25° C. and a condenser temperature of −50° C. or lower for 48 hours to give a dark, powdered color concentrate.

The aforementioned general procedure was carried out in duplicate with four variations, as follows:

(1) No variation from the general procedure (pH=2.3).

(2) The initial pH was raised to 3.0 with 50% NaOH before ultrafiltration.

(3) No adjustment of pH until after collection of 660 pounds of permeate (about ⅓ through the process), at which point the pH was lowered to 2.0 by adding 1010 ml of 85% phosphoric acid.

(4) No adjustment of pH until after collecting 660 pounds of permeate, at which point the pH was adjusted to 1.4 by adding 1010 ml of concentrated sulfuric acid.

Based on equations for calculating the removal of freely permeable low molecular weight materials, 99.97% of these materials would have been removed. Analyses were performed on the parent caramel and on the color concentrate for 4-MeI for each of the process variations. The results for duplicate experiments (a) and (b) were as shown in Table IV.

TABLE IV

4-MeI CONTENT OF COLOR CONCENTRATES FOR EXAMPLE III

| Process Variations pH | 4-MeI Of Parent Caramel mg/kg (as is basis) (A) | 4-MeI Of Color Conc., mg/kg solids (B) | 4-MeI Of Color Conc., Diluted To Original Color Strength (mg/l)*** (B$^1$) | Solids % Recovery (C) | % Removal Of 4-MeI solids basis* (D) = $100 - \frac{B}{A} \times \frac{C}{100} \times 50\%$** |
| --- | --- | --- | --- | --- | --- |
| 1 (a) 2.3 | 253 | 297 | 54 | 26.7 | 84.3 ⎫ 86.2 |
| (b) 2.3 | 253 | 312 | 40 | 19.2 | 88.2 ⎭ |
| 2 (a) 3.0 | 253 | 334 | 64 | 28.1 | 81.4 ⎫ 83.5 |
| (b) 3.0 | 253 | 322 | 51 | 22.6 | 85.6 ⎭ |
| 3 (a) 2.1 | 253 | 227 | 43 | 28.0 | 87.4 ⎫ 86.3 |
| (b) 2.1 | 253 | 271 | 51 | 27.5 | 85.3 ⎭ |

TABLE IV-continued

4-MeI CONTENT OF COLOR CONCENTRATES FOR EXAMPLE III

| Process Variations pH | 4-MeI Of Parent Caramel mg/kg (as is basis) (A) | 4-MeI Of Color Conc., mg/kg solids (B) | 4-MeI Of Color Conc., Diluted To Original Color Strength (mg/l)*** ($B^1$) | Solids % Recovery (C) | % Removal Of 4-MeI solids basis* (D) = $100 - \frac{B}{A} \times \frac{C}{100} \times 50\%$** |
|---|---|---|---|---|---|
| 4 (a) 1.4 | 253 | 176 | 30 | 24.3 | 91.5 ⎫ 92.1 |
| (b) 1.4 | 253 | 161 | 26 | 23.0 | 92.7 ⎭ |

*Theoretical removal of freely permeable low molecular weight materials = 99.97%
**50% corrects for the original solids content of the whole caramel. A caramel with 250 ppm 4-MeI initially which gave 99.97% removal would have 0.6 ppm 4-MeI in the color concentrate.

***$B^1 = B \times \frac{C}{100} \times 0.5 \times \frac{100}{\% \text{ color recovery}} \times \rho$, where 0.5 is the initial caramel concentration (50%); % color recovery is from Column 2 in Table VI and $\rho$ is the density of the parent caramel (= 1.23)

As can be seen from this Table, lower pH's gave better removal of 4-MeI.

It should be noted that the use of a caramel with a low pH (unadjusted in the process), as would be readily available in a caramel color manufacturing plant, requires less addition of acid to reduce the pH.

Operating data for the runs are given in Table V, and color, UV and solids recoveries for the above runs are shown in Table VI.

TABLE V

OPERATING DATA FOR EXAMPLE III

| Process Variation | Initial Inlet/Outlet Pressure (PSIG) | Final Inlet/Outlet Pressure (PSIG) | Initial/Final Flux (GPM) | Initial/Final Flow (GPM) | Initial/Final Recirculation Flow (GPM) | Total Membrane Process Time (Hours) |
|---|---|---|---|---|---|---|
| 1 (a) | 160/80 | 160/80 | 226/218 | 214/207 | 37/36 | 1 |
| (b) | 160/80 | 160/78 | 210/190 | 213/206 | 37/37 | 0.8 |
| 2 (a) | 160/80 | 152/73 | 237/206 | 214/212 | 42/37 | 0.8 |
| (b) | 160/80 | 160/78 | 222/198 | 222/198 | 42/36 | 0.9 |
| 3 (a) | 160/81 | 150/70 | 230/166 | 214/204 | 36/36 | 1 |
| (b) | 162/80 | 160/80 | 230/123 | 214/196 | 36/36 | 0.9 |
| 4 (a) | 160/80 | 158/76 | 218/178 | 214/212 | 40/39 | 1 |
| (b) | 160/80 | 152/76 | 246/218 | 214/206 | 43/42 | 0.9 |

TABLE VI

RECOVERY OF COLOR, U.V. ABSORBANCE AND SOLIDS FOR EXAMPLE III

| Process Variation (Run No.) | % Recovery Color | % Recovery U.V. | % Recovery Solids |
|---|---|---|---|
| 1 (a) (180) | 90.2 | 50.8 | 26.7 |
| (b) (181) | 90.9 | 40.7 | 29.2 |
| 2 (a) (182) | 89.8 | 49.7 | 28.1 |
| (b) (183) | 87.1 | 42.5 | 22.6 |
| 3 (a) (184) | 90.1 | 51.4 | 28.0 |
| (b) (185) | 90.5 | 50.3 | 27.5 |
| 4 (a) (186) | 89.0 | 48.0 | 24.3 |
| (b) (187) | 87.7 | 46.2 | 23.0 |

EXAMPLE IV

Two experiments were carried out on an Amicon Ultra-Sept ultrafiltration unit with 1266 cm² of Amicon P-10 (10,000 Mol. wt. cut-off) membranes at a temperature of 30°–40° C.

In the first run (557-13), 1.195 kg. of an SAC-2 caramel (containing 144 ppm of 4-methylimidazole) was diluted to 4 l with water, to give a solids concentration of 20.4%. This was concentrated to 3.23 l in the Ultra-Sept and then 25.27 l of water was added in a continuous manner at the same rate as the permeate was removed, over a period of 2 hours, maintaining a constant retentate volume. After this, the retentate was concentrated to 1.6 l and freeze-dried.

A further experiment (557-15) was carried out in a similar manner except that the same caramel color was initially diluted with 0.625 M NaCl solution to give a molarity of 0.49. Thus, to 1.180 kg. SAC-2 was added 0.625 M NaCl to give 4 l of 0.49 M NaCl solution with 20.1% caramel color solids. It was concentrated to 3.23 l in the Ultra-Sept unit and then 27.07 l of water was added in a continuous manner at the same rate as the permeate was removed, over a period of 2.75 hours, maintaining a constant retentate volume. After this, the retentate was concentrated to about 1.6 l and freeze-dried.

With this apparatus and under these conditions, the salt reduced the rate of ultrafiltration, as seen by the slightly longer process time mentioned above, but improved the removal of 4-methylimidazole as shown below.

| Run No. | Variable | 4-MeI, final conc.* |
|---|---|---|
| 557-13 | control | 15 ppm |
| 557-15 | 0.49 M NaCl | 4 ppm |

(*diluted to original caramel color concentration)

Experiments similar to these were also performed on an Amicon Model 401 stirred cell ultrafiltration unit equipped with a PM-10 membrane. In these experiments, the high ionic strength improved the removal of 4-methylimidazole.

| Run No. | Variable | 4-MeI, final conc. |
|---|---|---|
| 543-54-LOC | control | 17.9 ppm |
| 543-45-10 | 0.5 M NaCl | 0(<5 ppm) |

EXAMPLE V

Effect of pH on Retention of Foaming Characteristic of SAC-1 Caramel Color During Ultrafiltration A series of three experiments, runs 219, 220, and 221, was performed on an SAC-1 caramel color which was selected for its good foaming characteristics. To 149 lbs. of caramel color was added 250 lbs. of water. In run 219, the pH was left unadjusted (3.8). In runs 220 and 221, the pH was adjusted to 5.9 and 2.65 at the start, respectively.

The samples were ultrafiltered with a DDS-RO 9 m$^2$ ultrafiltration unit equipped with GR8P (10,000 molecular weight cut-off) membranes. The process temperature was adjusted to 60° C. Continuous diafiltration (ultrafiltration with continuous addition of water at the same rate as removal of permeate) was carried out until approximately 870 lbs. of permeate was collected. Water addition then was stopped and ultrafiltration was carried out until approximately 230 lbs. of additional permeate was collected. For each experiment, a portion of the retentate was saved as a liquid and a portion was freeze dried. In addition, in runs 220 and 221 the pH of a portion of the retentate was readjusted to the initial caramel color pH and portions of the pH adjusted material were saved as liquid and as freeze-dried powder.

The ability of the samples to produce foam in the foam test was evaluated. The foam test consisted of using 6.7 g of whole caramel diluted to 100 ml with water in a graduated cylinder so that the resulting concentration is 4% solids, shaking vigorously for one minute, and recording the foam height and the time until the foam degraded to only 20% of its initial height. When testing color concentrates, an amount of liquid or freeze-dried powder was used which would give the same color intensity as obtained when the whole caramel color was tested. A further sample, reconstituted caramel, made by combining permeate and retentate in the proportions in which they were separated, was also tested. The results are given in Table VII.

As can be seen, the foaming is not destroyed in ultrafiltration and, in fact the height is enhanced by processing at pH 2.6 (see data for reconstituted caramel). However, the foam of the reconstituted caramel is not as stable as the control, except when processed at pH 3.8.

The data on the liquid retentate confirm this and show that the majority of the foaming character has stayed with the retentate (color concentrate).

However, after drying the color concentrates at pH 3.8, about one-half the foam height and two-thirds of the foam stability were lost. This indicates that most of the loss of foaming capability occurs during drying rather than during ultrafiltration.

On freeze-drying at the processing pH and then dissolving and adjusting to pH 3.8, the best retention of foaming character was obtained at pH 2.6. This demonstrates that some of the deleterious action of freeze-drying of color concentrates can be prevented by proper attention to pH.

TABLE VII

FOAMING OF CARAMEL COLOR AND COLOR CONCENTRATE

| SAMPLE | RUN NO. | PROCESS pH | FOAM HEIGHT, % OF CONTROL | TIME TO 80% LOSS IN HEIGHT, % OF CONTROL |
|---|---|---|---|---|
| CONTROL | (Parent) | | 100% | 100% |
| Combined Permeate and Retentate ("Reconstituted Caramel", pH adj. to about 3.8) | | | | |
| | 221 | 2.6 | 124% | 55% |
| | 219 | 3.8 | 95% | 92% |
| | 220 | 5.9 | 99% | 38% |
| Retentate (pH adj. to about 3.8 before testing) | | | | |
| | 221 | 2.6 | 120% | 54% |
| | 219 | 3.8 | 86% | 85% |
| | 220 | 5.9 | 105% | 56% |
| Freeze-dried Retentate (pH adj. to about 3.8 before freeze-drying) | | | | |
| | 221 | 2.6 | 49% | 33% |
| | 219 | 3.8 | 46% | 30% |
| | 220 | 5.9 | 54% | 21% |
| Freeze-dried Retentate (Freeze-dried at process pH, reconstituted in water and pH adj. to about 3.8 before testing) | | | | |
| | 221 | 2.6 | 64% | 44% |
| | 219 | 3.8 | 46% | 30% |
| | 229 | 5.9 | 54% | 35% |

EXAMPLE VI

Eight hundred pounds of caramel color feedstock (Type SAC-4; solids, 53.6% by weight; absorbance, 0.370 at 560 nm (0.1% w/v dilution); ash, 1.0–1.5%) was diluted with 828 pounds of soft dechlorinated water to a volume of about 177 gallons. This solution was warmed to 60° C. and ultrafiltered on a DDS-RO-Module 35 ultrafiltration unit (9 m$^2$ membrane area) equipped with GR-8-P (10,000 molecular weight cutoff) membranes, to remove 531 pounds of permeate (approx. 59 gallons). Ultrafiltration was then continued on the retentate at constant volume, i.e., warm water was continuously added at the same rate at which permeate was being removed. After 4636 pounds of additional permeate (approx. 551 gallons) had been collected, the retentate was concentrated by ultrafiltration in the absence of any further water addition. In this manner, 491 pounds (59 gallons) of additional permeate were collected.

In theory, any freely permeable low molecular weight molecules would be removed to an extent of 99.7%. Since, as discussed later, 29% of the solids remained, the final concentration of low molecular weight impurities would be about 1% of the dry weight of the product. It has been found that, for this Type SAC-4 caramel color, the low molecular weight components have about one-fourth the extinction coefficient (absorbance per unit weight) in the ultraviolet (280 nm) as do the high molecular weight components. Therefore, if the low and high molecular weight components were separated chromatographically, the low molecular weight component of this color concentrate would be expected to have about 0.25% of the total 280 nm absorbance of the color concentrate. The final product was, in fact, chromatographed on a column of Sephadex G-15 (Pharamacia Fine Chemicals, Inc.) using 0.05 M acetate buffer (Na$^+$), pH 4.8, as eluant and the percentage low molecular weight components by ultraviolet absorbance was measured as 0.41%, slightly above but close to the expected value.

The initial caramel contained 300 ppm, as is basis, of 4-Methylimidazole (4-MeI). This should have been reduced to 3 ppm in the dried final product. The actual concentration in the final product was found to be 207 ppm (dry weight basis), which means, correcting for solids recovery, that only 90% instead of 99.7% of the 4-MeI was removed during ultrafiltration.

The DDS unit has 120 membranes on 60 plates and provides 9 m² of membrane area. The flow pattern through the membrane stack is such that there are three sets of 40 parallel membranes in series. The process pressures were 170 psig inlet and 86 psig outlet, with the outlet pressure dropping to 80–82 psig toward the end of the run. The flow rate through the stack was 200 gpm for most of the run and dropped to 150 gpm in the final concentration phase. A flow of 45–50 gpm was maintained as a return to the feed tank from the recirculating retentate. The flux started at 120 gph, dropped to 65 gph at the end of the first concentration phase, gradually rose to 200 gph during continuous ultrafiltration with water addition and then dropped to 30 gph in the final concentration phase. The total membrane process time was 5¼ hours.

In the ultrafiltration process, 29% of the solids, 94% of the color as measured by absorbance at 560 nm and 60% of the ultraviolet absorbance as measured at 280 nm was recovered in the retentate.

The retentate was then spray-dried on a DeLaval spray-drier (6 ft i.d. × about 30 ft height; 475 lb/hr water removal capacity at 375° F.). Initial spray-drying was done at 1000 psig and 71 gph through a Spraying Systems #50 orifice insert (0.070" i.d.) with a #425 cup top core at 225° C. inlet and 90° C. outlet and the product (about 20 kg) was not fully dried; there were some wet lumps in the dry powder which were later removed by sifting. The spray drying conditions were changed to 4000 psig with a #56 orifice insert (0.0465" i.d.) with a 421 cup top core at 260° C. inlet and 90° C. outlet and the product (about 20 kg) dried well. A small portion was freeze-dried without any difficulty.

EXAMPLE VII

Eight hundred and ninety-six pounds (86 gallons) of caramel color feedstock (Type SAC-2, solids, 69.8% by weight; absorbance, 0.161 at 560 nm (0.1% w/v dilution) was diluted with 1688 pounds (193 gallons) of water to a volume of about 279 gallons. This solution was warmed to 60° C. and ultrafiltered on a DDS-RO-Module 35 Ultrafiltration unit (9 m² membrane area) described in Example VI to remove 1411 pounds (154 gallons) of permeate. Ultrafiltration was then continued on the retentate at constant volume, i.e., warm water was continuously added at the same rate at which permeate was being removed. After collecting 5281 pounds of additional permeate (approx. 615 gallons), the retentate was concentrated by ultrafiltration in the absence of any further water addition. In this manner, 619 pounds (74 gallons) of additional permeate were collected.

The process pressures were 170 psig inlet and 86 psig outlet, with the outlet pressure dropping to 80 psig toward the end of the run. The flow rate through the stack was 210 gpm for most of the run, dropping only to 206 gpm in the final concentration phase. A flow of 45–50 gpm was maintained as a return to the feed tank from the recirculating retentate. The flux started at 150 gpm, dropped to 55 gph at the end of the first concentration phase, gradually rose to 240 gph during continuous ultrafiltration with water addition and then dropped to 120 gph in the final concentration phase. The total membrane process time was 6⅓ hours.

In the ultrafiltration process, 14% of the solids, 92% of the color and 31% of the ultraviolet absorbance was recovered in the retentate. The lower solids recovery, as compared to that in Example VI, is attributable to the difference in the feedstocks employed.

In theory, any freely permeable low molecular weight molecules would be removed to an extent of 99.8%. Since only 14% of the solids remained, the final concentration of low molecular weight impurities would be about 1.5% of the dry weight of the product. It has been found that, for this SAC-2, the low molecular weight components have about one-third the extinction coefficient (absorbance per unit weight) in the ultraviolet (280 nm) as the high molecular weight components. Therefore, if the low and high molecular weight components in the retentate were separated chromatographically, the low molecular weight component of this color concentrate would be expected to have about 0.5% of the total 280 nm absorbance of the color concentrate. The final product was, in fact, chromotographed on a column of Sephadex G-15 (Pharamacia Fine Chemicals, Inc.) using 0.05 M acetate (Na+), pH 4.8:ethanol (80:20, V:V) as eluant, and the percentage low molecular weight components by ultraviolet absorbance was measured as 0.69%, slightly above but close to the expected value.

The initial caramel contained 163 ppm, as is basis, of 4-Methylimidazole (4-MeI) or 1668 ppm based on the recovered weight of high molecular component. This should have been reduced to 3 ppm in the dried final product. The actual concentration in the final product was found to be 273 ppm, which means, correcting for solids recovery, that only 84% instead of 99.8% of the 4-MeI was removed during ultrafiltration.

The retentate was then spray-dried on a DeLaval spray-drier (6ft i.d. × about 30 ft height; 475 lb/hr water removal capacity at 375° F.). The spray drying was done at 4000 psi with a #56 orifice insert (0.0465"i.d.) with a 421 cup top core at 260° C. inlet and 90° C. outlet and the product dried well.

A small portion of the retentate was freeze-dried without any difficulty.

EXAMPLE VIII

To 348 pounds of caramel color (Type SAC-4; solids, 54% by weight; absorbance 0.370 at 560 nm (0.1% w/v dilution); ash, 1.0–1.5%) was added 360 pounds of soft dechlorinated water to a volume of about 77 gallons. This material was ultrafiltered at 60° C. on a DDS-RO-Module 35 ultrafiltration unit, equipped with 9 m² of GR-8-P membranes, until 51.5 gallons of permeate had been collected and 25.5 gallons of retentate remained. At this point 25.5 gallons of water were added bringing the volume up to 51 gallons. Ultrafiltration was then continued until 25.5 gallons of permeate were collected. Adding 25.5 gallons of water and carrying out ultrafiltration from 51 gallons to 25.5 gallons was repeated four times in all. The retentate was then concentrated by collecting an additional ten gallons of permeate. The above process was performed three times (Run Nos. 69–71) with the operating conditions controlled as closely the same as practical in order to determine the reproducibility of recoveries of color, ultraviolet absorbance, and solids in the retentate. The process parameters and recoveries are listed in Table VIII.

TABLE VIII

| RUN NO. | 69 | 70 | 71 |
|---|---|---|---|
| Initial Inlet/Outlet | 125/74 | 121/71 | 131/82 |

TABLE VIII-continued

| RUN NO. | 69 | 70 | 71 |
|---|---|---|---|
| Pressure, PSIG Final Inlet/Outlet | 128/64 | 136/74 | 136/74 |
| Pressure, PSIG Initial | 222 | 222 | 225 |
| Flow, GPM Final | 63 | 105 | 90 |
| Flow, GPM Initial Permeation Flux, GPH | 151 | 107 | 139 |
| Final Permeation Flux (GPH) | 4 | 7 | 5.2 |
| Process Time, Hours | 2.7 | 3.4 | 3.2 |
| % Recovery, COLOR | 90.4 | 90.5 | 90.5 |
| % Recovery, U.V. (280 nm) | 48.7 | 48.5 | 48.7 |
| % Recovery, Solids | 30.0 | 29.6 | 29.1 | by the high $PEAK_1/PEAK_2$ value in Table IX, undergone substantial polymerization and degradation. Thus, although the increased temperature for these two runs reduced the process time, it was at the expense of product quality.

A small portion of retentate from each experiment was freeze-dried.

TABLE IX

| RUN NO. | TEMP (°C.) | PROCESS TIME (min.)* | FINAL SOLIDS (%) | CORRECTED RECOVERY (%) | | | TOTAL TIME AT TEMP. (min.) | $PEAK_1/PEAK_2$** |
|---|---|---|---|---|---|---|---|---|
| | | | | $A_{560}$ | $A_{280}$ | SOLIDS | | |
| 42 | 60 | 143 | 31.1 | 90.7 | 54.2 | 28.8 | 153 | — |
| 43 | 70 | 98 | 30.5 | 85.5 | 49.5 | 25.7 | 152 | 0.88 |
| 44 | 80 | 73 | 30.6 | 84.7 | 48.5 | 25.0 | 125 | 1.06 |
| 45 | 90 | 89 | 31.0 | 85.7 | 52.8 | 27.2 | 106 | 1.23 |

*Corrected to same end point of processing
**Higher values of $PEAK_1/PEAK_2$ are an indication of the polymerization and degradation of the polymeric caramel color bodies and is the ratio of two high molecular weight components resolved by gel permeation chromatography on Biogel A (1.5m) using 0.05M acetate ($Na^+$), pH 4.8:ethanol (80:20, V:V).

EXAMPLE IX

A series of experiments was conducted in order to investigate the effect of temperature on the ultrafiltration of caramel. In these experiments, the water was added batch-wise, rather than continuously as in the previous examples.

In each experiment, 348 pounds of caramel color feedstock (Type SAC-4; solids 54% by weight; absorbance 0.370 at 560 nm (0.1% w/v dilution) was diluted with 360 pounds of water to a volume of about 77 gallons and warmed to the temperature shown below. Each solution was ultrafiltered on a DDS-RO-Module 35 ultrafiltration unit utilizing 9 $m^2$ of GR-6-P membranes having a stated molecular weight cut-off of 25,000. In each instance, ultrafiltration was conducted at a pressure of about 120-130 psig inlet pressure.

For each run shown, ultrafiltration was conducted without further addition of water until approximately 464 pounds (51.5 gallons) of permeate had been collected. Then 213 pounds of water (25.5 gallons) was added to the retentate and continued at the appropriate temperature until about 25.5 gallons of additional permeate was collected. This step was repeated twice more. Ultrafiltration was then continued without further addition of water until 10 gallons of permeate was collected or until the permeation rate was prohibitively slow. Based on equations for calculating the removal of freely permeable low molecular weight materials, 97.5% of these materials would have been removed.

The retentate product resulting from each of these runs was measured for the percent recovery of color (absorbance measured at 560 nm), UV (absorbance at 280 nm) and solids. The results are shown in Table IX.

The product produced by processing at 90° C. was lumpy, due to overheating and degradation, and the product produced by processing at 80° C. had, as shown

EXAMPLE X

A number of experiments were conducted to investigate the effects of pressure, flow rate and membrane type on caramel ultrafiltration.

For each of the runs, the same general caramel color feedstock was employed (Type SAC-4) and other variations in the process (e.g., temperature) were kept as similar as possible. Caramel feedstock was initially mixed with water (348 lbs. feed to 360 lbs. water) and ultrafiltered on a DDS-RO Model 35 ultrafiltration unit until 463 pounds of permeate was collected and 245 lbs. or about 25.6 gallons of retentate remained. Water (213 lbs., 25.6 gallons) was then added to the retentate and the mixture ultrafiltered until 25.6 gallons was collected. Twice more the retentate was again mixed with additional water (25.6 gallons) and ultrafiltered until 25.6 gallons was collected. Finally, the retentate was concentrated (e.g., no water addition) in the ultrafiltration unit until a retentate volume of about 16 gallons was reached. For each such stage of each overall process, the flow rates through the membrane stack were kept substantially constant. As with all other experiments with this equipment, the 9 $m^2$ membrane area consisted of three groups of 40 parallel membranes—the three groups being in series.

The results of these runs are summarized in Tables X and XI. In the Tables, the reference to "Original GR8P Membranes" refers to the first lot of polysulfone 10,000 molecular weight cut-off membranes; "GR6P Membranes" refers to a lot of 25,000 molecular weight cut-off polysulfone membranes. Where multiple runs are indicated, the measured figures represent arithmetic averages.

As can be seen in Table X, with the GR6P and the first GR8P set of membranes, higher pressure and flow generally give shorter processing times. The second lot of GR8P membranes appear to have been damaged in some way because they did not respond as expected and the process times are extended.

As can be seen in Table XI, in all cases the higher pressures and higher flow give higher recovery of the solids, color, and, generally, ultraviolet absorbance in the retentate (color concentrate). Chromatography on G-15 Sephadex gel, as described previously, showed that there was no significantly greater amount of low molecular weight materials in the retentate and, therefore, the higher recoveries must have resulted from improved recovery of high molecular weight materials.

TABLE X

| RUN NO.(S) | PRESSURE (bar) IN-LET | PRESSURE (bar) OUT-LET | FLOW RATE (gpm) | PROCESS TIME (min.) ORIGINAL GR8P | GR8P | GR6P |
|---|---|---|---|---|---|---|
| 28,29,30 | 5.1 | 3 | 177 (est.) | 167 (ave.) | | |
| 34 | 6.0 | 3.8 | 177 | 135 | | |
| 79 | 6.0 | 3.8 | 177 | | 174 | |
| 37,39,41 | 6.0 | 3.8 | 177 | | | 153 (ave.) |
| 35 | 8.5 | 3.3 | 216 | 108 | | |
| 80 | 8.5 | 3.3 | 216 | | 177 | |
| 42 | 8.5 | 3.3 | 216 | | | 143 |
| 67,68,75 | 8.5 | 4.5 | 216 | | 173 (ave.) | |
| 50 | 8.5 | 4.5 | 216 | | | 120 (est.) |

The results are summarized in Table XII. The figures shown represent arithmetic averages of the data collected for these runs. It can be seen that higher pressure and flow in the DDS unit gives shorter process times and better color recovery in the retentate. The shorter processing time is especially important since this means that larger batches can be processed on a given unit without so greatly prolonging the process so as to cause damage to the colorant.

TABLE XII

| RUN NOS. | INLET PRESSURE (PSIG) | OUTLET PRESSURE (PSIG) | FLOW (GPM) START | FLOW (GPM) END | % SOLIDS RECOVERY | % COLOR RECOVERY | % UV RECOVERY | MEAN INITIAL PRESSURE (PSIG) | PROCESS TIME (min) |
|---|---|---|---|---|---|---|---|---|---|
| 121 122 123 | 165 | 80 | 210 | 91 | 29.9 | 94.0 | 55.4 | 122.5 | 108 |
| 102 103 129 | 147 | 64 | 229 | 93 | 29.4 | 92.0 | 53.6 | 105.5 | 109 |
| 125 126 127 | 141 | 79 | 177 | 79 | 29.5 | 93.3 | 53.0 | 110 | 124 |
| 100 101 104 | 126 | 44 | 225 | 73 | 29.8 | 91.9 | 54.4 | 85 | 125 |
| 105 106 | 100 | | 192 | 85 | 26.9 | 90.8 | 52.8 | 71 | 154 |

EXAMPLE XII

In order to evaluate the general applicability of ultrafiltration to the preparation of color concentrates, equipment of another manufacturer was evaluated. Two ultrafiltration units supplied by Abcor Corp. were utilized, a 1" bore tubular module equipped with proprietary membrane materials, HFM-180, said to have a molecular weight cut-off of 18,000 or HFM-100, said to have a molecular weight cut-off of 12,000 (Example 13); and a spiral wound module equipped with a polysulfone membrane.

TABLE XI

| MEMBRANE | RUN NO.(s) | SOLIDS RECOVERY (%) | COLOR RECOVERY (%) | UV RECOVERY (%) | FINAL SOLIDS CONC. (%) |
|---|---|---|---|---|---|
| Orig. GR8P | 28,29,30 | 25.1 | 88.3 | 49.3 | 25.3 |
| Orig. GR8P | 34 | n.a | n.a | n.a | 29.0 |
| GR8P | 79 | 25.1 | 88.4 | 49.5 | 25.5 |
| GR6P | 37,39,41 | 24.9 | 86.7 | 48.1 | 27.5 |
| Orig. GR8P | 35 | 27.8 | 92.8 | 55.5 | 29.1 |
| GR8P | 80 | 26.6 | 90.5 | 50.9 | 27.4 |
| GR6P | 42 | 28.8 | 90.7 | 56.2 | 31.1 |
| GR8P | 67,68,75 | 28.0 | 91.2 | 52.5 | 27.5 |

EXAMPLE XI

A series of experiments was performed on the DDS ultrafiltration unit utilizing a stack of GR8P membranes (approx. molecular weight cut-off, 10,000), to optimize the effect of flow rate and pressure on the ultrafiltration of caramel color. In each run, the caramel color feedstock used was 348 pounds of SAC-4 which was mixed with 360 pounds of water and ultrafiltered until 462 pounds of permeate was collected, leaving 25.6 gallons of retentate. The retentate from this first pass was mixed with 25.6 gallons of additional water and ultrafiltered until 25.6 gallons of permeate was removed and 25.6 gallons of retentate again remained. This step was repeated two (2) additional times. Finally, no additional water was added to the retentate, but ultrafiltration was continued until approximately 16 gallons of retentate remained.

The tubular module was equipped with two parallel sets of 14 ten foot long HFM-180 membrane tubes in series. To 348 pounds of SAC-4 caramel color was added 360 pounds of soft, dechlorinated water. The mixture was circulated through the membrane tubes at 55° C. until 462 pounds of permeate was collected, giving a retentate volume of 25.6 gallons. In the second stage, 25.6 gallons of water was added to the retentate and ultrafiltration was continued until 25.6 gallons of permeate was collected. This was repeated twice more and then a fifth or concentration phase was carried out by ultrafiltration without addition of water until a final retentate volume of 16 gallons was obtained. A portion of the retentate samples thus prepared were freeze-dried on a Virtis FFD-15 freeze-drier. The average recovery in the retentate during three ultrafiltration experiments was 80.0% of the color, 22.6% of the solids and 44.0% of the ultraviolet absorbance.

These experiments were repeated using 332 pounds of an SAC-2 caramel color which was diluted with 624 pounds of soft dechlorinated water and ultrafiltered at 55° C. until 740 pounds of permeate was collected, leaving 27 gallons of retentate. In the second stage, 27 gallons of water was added to the retentate and ultrafiltration was continued until 27 gallons of permeate was collected. This was repeated twice more. In the fifth and final stage of the process, ultrafiltration was continued without the addition of more water until 5.5 more gallons of permeate was collected. The average recovery in the retentate during three ultrafiltration experiments was 90.1% of the color, 13.2% of the solids, and 41.4% of the ultraviolet absorbance (as measured at 280 nm). Although SAC-2 is less highly colored than SAC-4, a higher percentage of the color was retained when SAC-2 was processed than for SAC-4.

Two experiments carried out with the Abcor spiral wound unit equipped with polysulfone membranes were done on a somewhat smaller scale than above. To 261 pounds of SAC-4 caramel color was added 270 pounds of soft dechlorinated water. This mixture was ultrafiltered at 60° C. until 346 pounds of permeate was collected, giving 19 gallons of retentate. In the second processing stage, 19 gallons of water was added to the retentate and ultrafiltration was carried out until 19 gallons of permeate was collected. This was repeated twice more and then in the fifth processing stage the retentate was concentrated, without addition of more water, by ultrafiltration to a volume of about 14.5 gallons. The average recovery was 91.4% of the color, 30.3% of the solids and 58.37% of the ultraviolet absorbance. These recoveries are comparable to those obtained on the DDS unit equipped with polysulfone membranes and higher than obtained for SAC-4 on the Abcor using HFM-180 membranes.

EXAMPLE XIII

Several experiments were conducted utilizing an Abcor ultrafiltration unit containing a number of 1" diameter by 10 foot long tubular HFM-100 membranes (approx. molecular weight cut-off, 12,000). The retentate circulates through the tubes. The membrane is coated on the walls of the tube so the permeate goes through the walls of the tube, to the outside, and drips into a central collection pan. There were two parallel sets of membranes with, as shown in Table XIII, 8 to 14 tubes in series in each set.

Due to the limitations of the strength of the membrane and membrane support material, the process was carried out at 55° C. at a maximum of about 55 psig inlet pressure and 13 psig outlet pressure. The outlet pressure was controlled by a valve on the outlet of the tube stack. The inlet pressures was controlled by partially closing a valve on the outlet of the pump, when necessary; however, in some cases, particularly with fewer tubes in series, it was not possible to maintain the inlet pressure as high as 55 psig (Table XIV), even at higher flow rates (Table XV). In runs 64, 65 and 66, the SAC-4 caramel color feedstock was mixed with water (348 lbs caramel color/360 lbs water) and was subjected to ultrafiltration until 462 pounds of permeate was collected and 25.6 gallons of retentate. The retentate from this first pass was mixed with additional water (25.6 gallons retentate/25.6 gallons water) and again ultrafiltered, after which this step was repeated two additional times. In the fifth and final pass, no water was added to the retentate prior to ultrafiltration, rather the retentate was concentrated to approximately 16 gallons. Runs 90–97 were carried out using the same ratio of water, caramel, retentate and permeate, but the starting material was 278 pounds of SAC-4 and 288 pounds of water.

The results of these experiments are summarized in Tables XIII and XVI.

It can be seen that the retention of color for the two sets of membranes (Table XIII, runs 64–66 vs. runs 90–99) are slightly different, with higher color and solids recovery from the original membranes (runs 64–66). Unlike the DDS unit where higher pressures can be used to achieve higher recirculation flow rate, reducing the number of tubes is the only way to increase the recirculation flow through the tubes because of the limited strength of the support material. In the Abcor unit, higher flow rates gave no significant change in the recovery of color. Higher flow rates gave higher flux through the membrane (Table XVI), particularly in the case of only eight membranes in series, but because of the reduced membrane area, the total flux for the equipment would have been reduced.

TABLE XIII

| RUN NO. | # OF TUBES IN SERIES | TOTAL # OF TUBES | INITIAL RECIRCULATION FLOW (GPM) | % RECOVERY | | |
|---|---|---|---|---|---|---|
| | | | | COLOR | SOLIDS | UV |
| 90 & 91 | 8 | 16 | 39.0 | 84.0 | 23.8 | 49.6 |
| 92 & 93 | 10 | 20 | 30.0 | 84.9 | 24.8 | 48.6 |
| 94 & 95 | 12 | 24 | 27.5 | 84.3 | 26.2 | 48.0 |
| 96 & 97 | 14 | 28 | 25.5 | 83.6 | 23.8 | 46.8 |
| *64, 65, & 66 | 14 | 28 | 25.5 | 87.0 | 25.5 | 48.6 |
| **98 & 99 | 8 | 16 | 34.5 | 84.3 | 23.3 | 47.4 |

*These runs were made with a previous set of 12,000 MW cut-off (HFM-100) membranes.
**Booster pump added to maintain pressure and flow throughout the runs.

TABLE XIV

| RUN NO. | # OF TUBES IN SERIES | INLET PRESSURE** (PSIG) | | | | | | | | |
|---|---|---|---|---|---|---|---|---|---|---|
| | | PASS 1 | | PASS 2 | | PASS 3 | | PASS 4 | | PASS 5 | |
| | | START | END | START | END | START | END | START | END | START | END |
| 90/91 | 8 | 55/55 | 35/35 | 55/55 | 36/35 | 55/55 | 41/43 | 55/55 | 40/50 | 40/50 | 30/42 |
| 92/93 | 10 | 55/55 | 38/35 | 55/55 | 40/32 | 55/55 | 50/42 | 55/55 | 52/54 | 52/54 | 37/43 |
| 94/95 | 12 | 55/55 | 42/46 | 55/55 | 50/52 | 55/55 | 54/55 | 55/55 | 54/54 | 54/54 | 40/55 |
| 96/97 | 14 | 55/55 | 38/37 | 55/55 | 48/34 | 55/55 | 55/51 | 55/55 | 55/52 | 55/52 | 36/30 |
| *98/99 | 8 | 55/55 | 55/55 | 55/55 | 55/50 | 55/55 | 55/55 | 55/55 | 55/55 | 55/55 | 55/20 |

TABLE XIV-continued

| | # OF TUBES | INLET PRESSURE** (PSIG) | | | | | | | | |
|---|---|---|---|---|---|---|---|---|---|---|
| | | PASS 1 | | PASS 2 | | PASS 3 | | PASS 4 | | PASS 5 |
| RUN NO. | IN SERIES | START | END | START | END | START | END | START | END | START END |
| ***64/65/66 | 14 | 55/56/55 | 56/55/56 | 55/55/55 | 56/58/57 | 55/55/55 | 57/56/56 | 55/55/56 | | 55/57/56 |

*Two pumps were used
**Outlet pressure = 13 psig
***These runs were made with a previous set of 12,000 MW cut-off (HFM-100) membranes.

TABLE XV

| | | INITIAL AND FINAL FLOW THROUGH MEMBRANE STACK (GPM) | | | | | | | | |
|---|---|---|---|---|---|---|---|---|---|---|
| | # OF TUBES | PASS 1 | | PASS 2 | | PASS 3 | | PASS 4 | | PASS 5 |
| RUN NO. | IN SERIES | START | END | START | END | START | END | START | END | START END |
| 90/91 | 8 | 39/39 | 38/30 | 38/33 | 34/32 | 35/33 | 30/32 | 39/33 | 25/33 | 30/33 27/33 |
| 92/93 | 10 | 30/30 | 25/24 | 32/30 | 25/28 | 30/31 | 27/27 | 30/30 | 27/27 | 27/27 24/26 |
| 94/95 | 12 | 28/28 | 22/23 | 28/28 | 26/26 | 28/27 | 27/27 | 28/27 | 27/26 | 27/26 23/26 |
| 96/97 | 14 | 26/26 | 24/22 | 26/26 | 24/21 | 26/26 | 24/24 | 26/26 | 25/24 | 25/24 20/24 |
| *98/99 | 8 | 34/31 | 38/34 | 36/35 | 36/33 | 37/35 | 33/34 | 38/38 | 36/34 | 36/34 33/27 |
| **64/65/66 | 14 | 26/26/25 | 25/26/25 | 26/26/26 | 25/25/26 | 26/26/26 | 24/25/26 | 25/26/26 | | 25/26/26 |

*Two pumps were used
**These runs were made with a previous set of 12,000 MW cut-off (HFM-100) membranes

TABLE XVI

| RUN NO. | # OF TUBES IN SERIES | AVERAGE PERMEATION FLUX PASS 1 THRU PASS 5 | AVERAGE | AVERAGE PERMEATION FLUX PASS 1 THRU PASS 4 | AVERAGE |
|---|---|---|---|---|---|
| 98 | 8 | 18.8 | 19.4 | 26.8 | 26 |
| 99 | 8 | 20.0 | | 25.2 | |
| 90 | 8 | 14.1 | 14.5 | 20.5 | 20 |
| 91 | 8 | 14.8 | | 19.6 | |
| 92 | 10 | 12.8 | 12.4 | 18.2 | 16.6 |
| 93 | 10 | 12.0 | | 15.0 | |
| 94 | 12 | 13.3 | 13.8 | 18.2 | 17.9 |
| 95 | 12 | 14.3 | | 17.6 | |
| 96 | 14 | 12.4 | 10.8 | 17.3 | 15.8 |
| 97 | 14 | 9.2 | | 14.4 | |
| 64* | 14 | 17.4 | 17.1 | 20.2 | 21.7 |
| 65* | 14 | 16.4 | | 22.0 | |
| 66* | 14 | 17.6 | | 22.8 | |

Unit of flux is gallons/foot$^2$/day.
*These runs were made with a previous set of 12,000 MW cut-off (HFM-100) membranes.

EXAMPLE XIV

To 348 pounds of caramel color feedstock (Type SAC-4; solids, 54% by weight; absorbance 0.360 at 560 nm (0.1% w/v dilution)); was added 360 pounds of soft dechlorinated water to a volume of about 77 gallons. The retentate was ultrafiltered until 51.5 gallons of permeate had been collected. At this point 25.5 gallons of water were added bringing the volume up to 51 gallons. Ultrafiltration was then continued until 25.5 gallons of permeate were collected. The ultrafiltering from 51 to 25.5 gallons and then adding 25.5 gallons of water was repeated four times in all. The retentate was then further concentrated to 16 gallons by collecting an additional 9.5 gallons of permeate. The process temperature was 60° C. Calculations indicate that approximately 99.2% of the low molecular weight, freely permeable components would have been removed. Three replications of each SAC-4 caramel color from each of three manufacturers were made using the process described above in order to examine any variation due to possible variations in manufacturing. The average values for the process parameters and recoveries are listed in Table XVII. As can be seen, even though the nitrogen and sulfur analyses are somewhat different for whole caramel #3 compared to 1 and 2 and for each of the three final products, the processing and the recoveries are quite similar for this Type of Caramel Color.

TABLE XVII

| | MANUFACTURER | | |
|---|---|---|---|
| RUN NUMBERS | #1 67, 68, 75 | #2 69, 70, 71 | #3 76, 77, 78 |
| Initial Inlet/Outlet Press (PSIG) | 119/68 | 125/76 | 115/62 |
| Final Inlet/Outlet Press (PSIG) | 131/73 | 133/71 | 117/56 |
| Initial Flow (GPM) | 217 | 223 | 221 |
| Final Flow (GPM) | 86 | 86 | 54 |
| Initial Flux (GPH) | 127 | 132 | 132 |
| Final Flux (GPH) | 3.4 | 5.33 | 3.6 |
| Process Time (hours) | 2.9 | 3.1 | 2.7 |
| % Recovery Color | 91.2 | 90.5 | 91.7 |
| % Recovery U.V. | 52.4 | 48.6 | 54.4 |
| % Recovery | 28.1 | 29.6 | 29.0 |

TABLE XVII-continued

| RUN NUMBERS | MANUFACTURER | | |
|---|---|---|---|
| | #1<br>67, 68, 75 | #2<br>69, 70, 71 | #3<br>76, 77, 78 |
| Solids | | | |
| % N, concentrate, DWB* | 6.54 | 7.07 | 5.43 |
| % S, concentrate, DWB | 5.94 | 6.69 | 6.22 |
| % N, whole caramel, DWB | 7.21 | 7.33 | 5.20 |
| % S, whole caramel, DWB | 8.78 | 8.77 | 8.46 |

*DWB = dry weight basis

EXAMPLE XV

One index of the efficiency of ultrafiltration for removal of low molecular weight materials is the theoretical one, i.e., a calculation of the expected level of low molecular weight materials which would remain. These calculations have been briefly discussed and can be found in literature from manufacturers of ultrafiltration units or in various books on ultrafiltration.

A method of evaluating the efficiency of ultrafiltration for removal of low molecular weight components is examination by chromatography, say on Sephadex G-15 as mentioned in previous Examples. As already mentioned, these analyses showed reasonable agreement with the values obtained by calculation.

A further method for monitoring the ultrafiltration process is to examine the removal of specific components. Komoto and associates have shown that 4-methylimidazole (4-MeI) is poorly removed by ultrafiltration, unless the pH of the caramel solution is adjusted to particular values during ultrafiltration. Based on the data given in Komoto's papers, his work was limited to an SAC-2 diluted to very low solids concentration and processed with impractically long processes on laboratory equipment. It was therefore of interest to evaluate, beyond that revealed in Examples III and IV, the effect of some of the processing variables of the present invention on the removal of 4-MeI.

Tables XVIII and XIX contain data on the 4-MeI content of the color concentrates (retentate) from a number of experimental runs using various operating conditions and several different SAC-4 caramel colors.

TABLE XVIII

Effect of pH and Ionic Strength on
4-MeI Content of Color Concentrates
(DDS, 10,00 MW cut-off membrane)

| RUN NO. | PROCESS CONDITION pH | 4-MeI, ppm | |
|---|---|---|---|
| 182/183 | 3.0 | 328 | |
| 180/181 | 2.3 | 304 | |
| 184/185 | 2.1 | 249 | |
| 186/187 | 1.4 | 168 | |
| 162/163 | 1.3 | 70 | |
| 18 | 3 | 350 | |
| 20 | 5 | 315 | |
| 22 | 7 | 315 | |
| 19 | 8.5 | 230 | |
| 48 | 3 (Ionic strength, same as for pH 8,5) | 230 | (25,00 MW cut-off membrane) |

TABLE XIX

Effect of Ultrafiltration Equipment and Membranes
on Residual 4-MeI Content of Color Concentrate

| RUN NO. | Degree of Removal, Theoretical | 4-MeI, ppm* | Equipment |
|---|---|---|---|
| 57 | 97.4% | 340 | Abcor tubular, 18,000 MW membranes, 55° C. |
| 58 | 97.4% | 374 | Abcor tubular, 18,000 MW membranes, 60° C. |
| 64 | 97.4% | 360 | Abcor tubular, 12,000 MW 55° C. |
| 166 | 97.5% | 300 | Abcor spiral wound, polysulfone membrane, 10,000 MW cut-off, 60° C. |
| 18 | 97.0% | 350 | DDS, 10,000 MW membranes, 60° C., average pressure 60 psig |
| 140 | 99.7% | 207 | DDS, 10,000 MW membrane, 60° C., average pressure 125 psig |

*dry weight basis

EXAMPLE XVI

A series of experiments was conducted to determine the processability of different Classes and Types of caramel colors.

In all cases, ultrafiltration was carried out at 60° C. on a DDS-RO-Module 35 ultrafiltration unit. For the AC-2 and AC-3 experiments, the unit was equipped with GR6P (25,000 MW cut-off) polysulfone membranes. For all other experiments the unit was equipped with GR8P (10,000 MW cut-off) polysulfone membranes. The DDS unit has 120 membranes on 60 plates and provides 9 $m^2$ of membrane area. The flow pattern through the membrane stack is such that there are three sets of 40 parallel membranes in series.

A portion of each retentate was freeze-dried without difficulty on a Virtis-Repp FFD-15 freeze drier with a shelf temperature of about 25° C. and a condenser temperature of −50° C. or lower for 48 hours to give, except where noted, a dark, powdered color concentrate.

CP-1

To 149 pounds of caramel color feedstock (Type CP-1; solids, 69.9% by weight; absorbance, 0.078 at 560 nm (0.1% w/v dilution); N and S, <0.1%) was added 250 pounds of soft dechlorinated water to a volume of about 45 gallons. This solution was warmed to 60° C. and ultrafiltration was begun. However, the rate of ultrafiltration was extremely slow and the experiment was terminated (run 171). The membranes were carefully and thoroughly cleaned with hot detergent and the experiment was repeated with the same poor results (run 172), such that ultrafiltration of CP-1 was considered to be impractical. Therefore, it was decided that a study would be done to determine whether altering the pH of the caramel solution would increase the permeate flux.

In two experiments (run 175 and 177) the pH was raised to about 7.1 before processing. The processing was carried out at constant volume by adding warm water at the same rate that the permeate was removed until 1840 pounds (approx. 221 gallons) of permeate was collected. The retentate was concentrated by ultrafiltration in the absence of any further water addition by collecting 224 pounds (25 gallons) of additional permeate. In theory, 99.7% of the low molecular weight materials originally present would have been removed. For the two experiments, the average process pressures were 160 psig inlet and 80 psig outlet, with the outlet pressure dropping to 77 psig toward the end of the run. The flow rate through the stack was 208 gpm. A flow of 46 gpm was maintained as a return to the feed tank from the recirculating retentate. The flux started at 135 gph, gradually rose to 270 gph during continuous ultrafiltration with water addition and then dropped to 55 gph in the final concentration phase. The total membrane process time was 1.4 hr., thus indicating that pH adjustment was successful.

In the ultrafiltration process, 20% of the solids, 80% of the color and 33% of the ultraviolet absorbance was recovered in the retentate.

CP-2

As mentioned after runs 171 and 172 in the discussion of CP-1 caramel, it was decided to determine whether adjusting the pH of the dilute CP-1 caramel would give increased flux during processing—however, due to the limited supply of each Type of caramel color obtained for these experiments, it was decided to first try ultrafiltration of CP-2 and, if the rate of ultrafiltration also was low, to adjust the pH of the dilute CP-2 caramel color to evaluate the effect of pH on flux. To 149 pounds of CP-2 caramel color (absorbance 0.095 at 560 nm (0.17 w/v solution), solids 64.8% by weight, N and S <0.1%) was added 250 pounds of soft dechlorinated water to a volume of about 45 gallons. This solution was warmed to 60° C. and recirculated through the ultrafiltration unit, returning the permeate to the feed tank. The flux was measured and then remeasured after pH adjustment with 50% NaOH solution as shown below (run 174).

| pH | Flux (liter/hr-m$^2$) | NaOH, ml (total) |
|---|---|---|
| 3.25 | 13 | 0 |
| 3.5 | 12 | 50 |
| 3.7 | 12 | 200 |
| 4.5 | 17 | 700 |
| 7.7 | 108 | 1700 |

The flux dropped slightly, to 96 liter/hr-m$^2$ (230 gph), then collection of permeate began and water was added at the same rate at which permeate was removed to maintain a constant volume of retentate until 1860 pounds (approx. 224 gallons) of permeate was collected. The flux rose during processing to 120 liter/hr-m$^2$. The pH was reduced with 85% phosphoric acid, with the change in flux shown below and then the retentate was concentrated from 45 gallons to 20 gallons by collecting 224 pounds of permeate. The flux dropped to 8 liter/m$^2$-hr and the liquid turned from black to brownish, as though precipitation had occurred, by the end of the concentration phase.

| pH | Flux (liter/m$^2$-hr) | H$_3$PO$_4$, ml (total) |
|---|---|---|
| 6.9 | 120 | 0 |
| 5.0 | 83 | 164 |
| 3.4 | 22 | 414 |

In theory, 99.7% of the low molecular weight materials would have been removed.

In the ultrafiltration process, 23% of the solids, 90% of the color and 36% of the ultraviolet absorbance was recovered in the retentate.

The process pressures were 160 psig inlet and 80 psig outlet, with the outlet pressure dropping to 77 psig toward the end of the run. The flow rate through the stack was 208 gpm. A flow of 46 gpm was maintained as a return to the feed tank from the recirculating retentate. The flux started at 230 gph, gradually rose to 285 gph during continuous ultrafiltration with water addition and then dropped to 20 gph in the final concentration phase. The total membrane process time was 1.75 hours.

On freeze-drying of a portion, it was found to give a brownish powder with hazy solubility properties rather than the dark powder characteristic of other color concentrates.

The experiment was repeated (run 176) at a similar pH (6.8 dropping to 6.2 during ultrafiltration) although the flux was only about 43 l/m$^2$-hr during ultrafiltration at constant volume and the mass balance and recovery was poor. The pH was lowered to about 3.4. Again, the freeze dried product was brown in color. Both products were tested and found to be of poor quality compared to the caramel color from which they were derived. However, adjusting the pH of a color concentrate solution to about 7 improved its solubility and stability.

Therefore, the experiment was repeated one more time (Run 202), but with the final pH of the product left elevated. In this experiment, 348 pounds of CP-2 caramel color was blended with 360 pounds of soft dechlorinated water and adjusted to pH 7.1 with 4 liters of 50% NaOH to give a volume of about 77 gallons. This was ultrafiltered to remove 26 gallons of permeate and give a volume of 51 gallons. Warm water was then added continuously at a rate equal to that of permeate removal so as to keep the volume constant until 1827 pounds of permeate was collected at which time the warm water was turned off and the retentate was concentrated by ultrafiltration to a final volume of 35 gallons. In theory, 99.1% of the low molecular weight materials would have been removed.

In the ultrafiltration process, the initial flux was 135 l/m$^2$-hr, dropping to 40 at the end of the initial concentration phase, rising to 200 during continuous ultrafiltration and dropping to 40 at the end of the process.

The recovery of color was 76%, of solids was 19.5% and of ultraviolet absorbance was 40%. The freeze-dried powder was dark in color and had excellent solubility properties.

These experiments with CP-1 and CP-2 strongly demonstrate the importance of giving proper consideration to the pH during processing. CP-1 and CP-2 would be virtually free of 4-MeI and, therefore, the benefit is solely in the areas of processing rates and product quality.

CCS

In two experiments (Runs 170 and 171), 149 pounds of caramel color feedstock (Type CCS-1; solids, 66.4% by weight; absorbance, 0.093 at 560 nm (0.1% w/v dilution); N< 0.1%, S=0.14%) was diluted with 250 pounds of soft dechlorinated water to a volume of about 45 gallons. Ultrafiltration was begun and warm water was continuously added at the same rate at which permeate was removed. After 1860 pounds of permeate (approx. 221 gallons) had been collected, the retentate was concentrated by ultrafiltration in the absence of any further water addition by collecting 224 pounds (25 gallons) of additional permeate. In theory, 99.7% of the low molecular weight materials would have been removed. The process pressures were 135 psig inlet and 55 psig toward the end of the run. The flow rate through the stack was 210 gpm. A flow of 36 gpm was maintained as a return to the feed tank from the recirculating retentate. The flux started at 120 gph, gradually rose to 170 gph during continuous ultrafiltration with water addition and then dropped to 100 gph in the final concentration phase. The total membrane process time was 1.5 hr.

In the ultrafiltration process, 22.2% of the solids, 88.4% of the color and 38.4% of the ultraviolet absorbance was recovered in the retentate.

The freeze-dried retentate (color concentrate) had satisfactory properties when compared to the caramel color from which it was derived.

AC-1

In two experiments (Runs 178 and 179), 149 pounds of caramel color feedstock (Type AC-1; solids, 67.8% by weight; absorbance, 0.142 at 560 nm (0.1% w/v dilution); N=2.2%, S=0.3%) was diluted with 250 pounds of soft dechlorinated water to a volume of about 45 gallons. This solution was warmed to 60° C. and ultrafiltered while at constant volume; warm water was continuously added at the same rate at which permeate was being removed until 1860 pounds of permeate (approx. 221 gallons) was collected. The retentate was concentrated by ultrafiltration in the absence of any further water addition by collecting 224 pounds (25 gallons) of additional permeate. In theory, 99.7% of the low molecular weight materials would have been removed.

The process pressures were 160 psig inlet and 80 psig outlet. The flow rate through the stack was 210 gpm. A flow of 45 gpm was maintained as a return to the feed tank from the recirculating retentate. The flux in run 178 started at 76 gph, dropped to 63 gph at the end of the first concentration phase, held constant during continuous ultrafiltration and then dropped to 44 gph in the final concentration phase. The total membrane process time was 2.9 hr. The flux started and held constant at 60 gph in Run 179 through the end of continuous ultrafiltration and dropped to 50 gph at the end of the final concentration phase.

In the ultrafiltration process, 28% of the solids, 87% of the color and 50% of the ultraviolet absorbance was recovered in the retentate.

The feeeze-dried retentate (color concentrate) had satisfactory properties when compared to the caramel color from which it was derived.

AC-2

A sample of 332 pounds of caramel color feedstock (Type AC-2; solids, 66.6% by weight; absorbance, 0.212 at 560 nm (0.1% w/v dilution); N=3.5%, S=0.2%) was diluted with 624 pounds of soft dechlorinated water to a volume of about 75 gallons. This solution was warmed to 60° C. and ultrafiltered to remove 370 pounds of permeate (approx. 43 gallons). Ultrafiltration was then continued on the retentate at constant volume, i.e., warm water was continuously added at the same rate at which permeate was being removed. After 1320 pounds of additional permeate (approx. 157 gallons) had been collected, the retentate was concentrated by ultrafiltration in the absence of any further water addition. In this manner, 314 pounds (37 gallons) of additional permeate were collected. In theory, 97.7% of the low molecular weight materials would have been removed. The process pressures were 125 psig inlet and 70 psig outlet, with the outlet pressure rising to 88 psig toward the end of the run. The flow rate through the stack was 210 gpm for most of the run. The flux started at 140 gph, dropped to 80 gph at the end of the first concentration phase, gradually rose to 180 gph during continuous ultrafiltration with water addition and then dropped to 15 gph in the final concentration phase. The total membrane process time was 2.2 hours.

In the ultrafiltration process, 35% of the solids, 83% of the color and 52% of the ultraviolet absorbance was recovered in the retentate.

The freeze-dried retentate (color concentrate) had satisfactory properties when compared to those of the AC-2 caramel color from which it was derived.

AC-3

A sample of 332 pounds of caramel color feedstock (Type AC-3; solids, 69.5% by weight; absorbance, 0.332 at 560 nm (0.1% w/v dilution); N=3.7%, S=0.2% was diluted with 624 pounds of soft dechlorinated water to a volume of about 75 gallons. This solution was warmed to 60° C. and ultrafiltered at constant volume (warm water was continuously added at the same rate at which permeate was being removed) until 1790 pounds of permeate (approx. 203 gallons) was collected. The retentate was concentrated by collecting 752 pounds (86 gallons) of additional permeate. In theory, 97.7% of the low molecular weight materials would have been removed.

The process pressures were 133 psig inlet and 80 psig outlet, with the outlet pressure dropping to 71 psig toward the end of the run. The flow rate through the stack was 220 gpm for most of the run and dropped to 110 gpm in the final concentration phase. The flux started at 80 gph, gradually rose to 83 gph during continuous ultrafiltration with water addition and then dropped to 13 gph in the final concentration phase. The total membrane time was 3.2 hr.

In the ultrafiltration process, 34% of the solids, 83% of the color and 36% of the ultraviolet absorbance was recovered in the retentate.

The freeze-dried retentate had satisfactory properties when compared to the parent caramel from which it was derived. The quality of this color concentrate was slightly better than those from AC-1 and AC-2. Therefore, since the total color obtained would be higher per unit of caramel (because AC-3 is darker), it might generally be preferable to utilize AC-3 as the feedstock when an AC caramel color concentrate is required.

Several studies on SAC-4 ultrafiltration which required removal and replacement of some membranes were interspersed with the AC-2 and AC-3 studies. The DDS unit is designed such that the permeate from each pair of membranes is collected in a separate, clear permeate tube for transfer to the main collecting tube. It was noticed that the permeate tubes from new membranes contained darker permeate than those from membranes which had been exposed to both SAC and AC caramel colors. It appeared, therefore, that the normal alkali wash was not adequate to clean all traces of caramel color from the membranes and that fouling of the membranes had occurred due to interaction of AC components with SAC residues (and/or SAC components with AC residues). A detailed investigation was carried out which included cleaning with various cleaning agents, then replacing some membranes, and recirculating a solution of AC-3 at 60° C. to determine if the cleaning process had fully regenerated the membranes. It was found that high concentrations of hypochlorite (500 ppm) or hydrogen peroxide (500 ppm) would adequately clean the membranes.

SAC-1

In two experiments (Runs 160 and 161) 149 pounds of caramel color feedstock (Type SAC-1; solids, 66.3% by weight; absorbance, 0.146 at 560 nm (0.1% w/v dilution); N=3.2% S=5.1% dry basis) was diluted with 250 pounds of soft dechlorinated water to a volume of about 45 gallons. This solution was warmed to 60° C. and ultrafiltered at constant volume, (warm water was continuously added at the same rate at which permeate was being removed) until 1860 pounds of permeate (approx. 221 gallons) was collected. The retentate was concentrated by ultrafiltration in the absence of any further water addition by collecting 242 pounds (29 gallons) of additional permeate. In theory, 99.7% of the low molecular weight materials would have been removed. The process pressures were 156 psig inlet and 76 psig outlet, with the outlet pressure dropping to 70 psig toward the end of the run. The flow rate through the stack was 200 gpm. A flow of 45 gpm was maintained as a return to the feed tank from the recirculating retentate. The flux started at 215 gph, gradually rose to 400 gph during continuous ultrafiltration with water addition and then dropped to 300 gph in the final concentrate phase. The total membrane process time was 0.9 hr.

In the ultrafiltration process, 15% of the solids, 74% of the color and 27% of the ultraviolet absorbance was recovered in the retentate.

The freeze-dried retentate (color concentrate) when evaluated was found to be similar in most properties to the SAC-1 from which it was derived (good water and vinegar solubility, although slightly hazy in alcohol). However, of the 10 caramel color Types tested, this SAC-1 was the only caramel color said to be a foaming caramel (which is said to be useful in products such as Root Beer type soft drinks). The foaming character had been markedly reduced. Additional experiments designed to investigate this feature were performed and were earlier described in Example V.

SAC-2

Examples of processing of SAC-2 are shown in Example VII and elsewhere.

SAC-3

In two experiments (Runs 109 and 111), 434 pounds of caramel color feedstock [Type SAC-3; solids, 62.4% by weight; absorbance, 0.259 at 560 nm (0.1% w/v dilution); N=2.1%, S=3.5%] was diluted with 650 pounds of soft dechlorinated water to a volume of about 130 gallons. This solution was warmed to 60° C. and ultrafiltered to remove 800 pounds of permeate (approx. 90 gallons). Forty gallons of water was then added and ultrafiltration was continued until 343 pounds of additional permeate (approx. 40 gallons) was collected. The previous stage was repeated two more times. The retentate then was concentrated by ultrafiltration in the absence of any further water addition. In this manner, 154 pounds (19 gallons) of additional permeate were collected. In theory, 98.0% of the low molecular weight materials would have been removed.

The process pressures were about 149 psig inlet and 65 psig outlet, with the outlet pressure dropping by about 4 psig toward the end of the run. The flow rate through the stack was about 220 gpm for most of Run 109 and dropped to 43 gpm in the final concentration phase. For Run 111, the flow through the stack caried in each stage from 200 gpm at the start of a stage to 160–170 gpm at the end, with a further drop (but only to 150 gph) at the end of the process. A flow of 45 gpm was maintained as a return to the feed tank from the recirculating retentate for Run 109 and 55–60 gpm for Run 111. The flux started at 67 gph, dropped to 32 gph at the end of the first concentration phase, gradually rose to 111 gph during ultrafiltration and then dropped to 1.3 gph in the final concentration phase for Run 109. The flux was about one-half these values in Run 111 and therefore, the total membrane process time was 3.7 hours for Run 109 and 6.1 hours for Run 111. For SAC-3 about 25% of the solids, 97% of the color and 43% of the ultraviolet absorbance was recovered in the retentate.

The freeze-dried retentate (color concentrate) had satisfactory properties when compared to the caramel color from which it was derived.

SAC-4

Examples of successful processing of SAC-4 caramel color are described in many previous Examples.

After completion of this series of experiments, the freeze-dried color concentrates were analyzed for N and S content and color intensity in order to determine whether these data might indicate that color concentrates might be satisfactorily classified by these analyses, as is done for the four proposed Classes and 10 proposed Types of caramel color. The data in Table XX show that a classification by Classes using N and S may be possible, although more data would be needed to define the ranges of analyses for each class and to evaluate whether Types of color concentrate can be distinguished. A summary of the recoveries of the color, solids and ultraviolet absorbance in this series of experiments is provided in Table XXI.

TABLE XX

ANALYSES OF COLOR CONCENTRATES

| Parent Type | % N | % S | Absorbance (lg/liter) at 610 nm |
|---|---|---|---|
| CP-1 | 0.07 | 0.12 | 0.27 |
| CP-2 | 0.0 | 0.16 | 0.30 |
| CCS | 0.0 | 0.26 | 0.35 |
| AC-1 | 3.6 | 0.4 | 0.47 |
| AC-2 | 5.6 | 0.2 | 0.67 |
| AC-3 | 7.6 | 0.2 | 0.63 |
| SAC-1 | 3.2 | 5.0 | 0.61 |
| SAC-2 | 3.6 | 4.0 | 1.18 |
| SAC-3 | 3.4 | 4.3 | 1.00 |
| SAC-4 | 6.3 | 6.5 | 1.4 |

TABLE XXI

SUMMARY OF RECOVERIES IN COLOR CONCENTRATES

| | % Recovery | | |
|---|---|---|---|
| Caramel Color Type | Color ($A_{560}$) | Solids | U.V. ($A_{280}$) |
| CP-1 | 80 | 20 | 33 |
| CP-2 | 76 | 20 | 40 |
| CCS | 88 | 22 | 38 |
| AC-1 | 87 | 28 | 50 |
| AC-2 | 83 | 35 | 52 |

TABLE XXI-continued
SUMMARY OF RECOVERIES IN COLOR CONCENTRATES

| Caramel Color Type | % Recovery | | |
|---|---|---|---|
| | Color ($A_{560}$) | Solids | U.V. ($A_{280}$) |
| AC-3 | 83 | 34 | 36 |
| SAC-1 | 74 | 15 | 27 |
| SAC-2 | 91 | 14 | 39 |
| SAC-3 | 97 | 25 | 43 |
| SAC-4 | 90 | 27 | 53 |

In view of the foregoing data, it will be seen that only three relatively minor problems were observed in processing all ten Types of caramel colors; they have been discussed under the appropriate Types and are summarized here.

1. When switching between Classes of caramel colors it is extremely important to thoroughly clean all residue of caramel color from the membranes. This was noted when switching from an SAC-4 to an AC-3 and back to SAC-4. After incorporation of extended clean-up, within the limits allowed by the membrane manufacturer, the problem was not again encountered.

2. For some caramel colors, modifications to the process are necessary in order to retain the proper final properties of the color concentrate. For instance, SAC-2 caramel color is more readily degraded by extended processing times than is SAC-4; therefore it would be beneficial to adjust the relative batch size to membrane area for SAC-2 to reduce somewhat the total processing time.

Another example of a process modification is that CP-1 and CP-2 caramel colors were impractically slow to process. Raising the pH of the caramel color solution to about 7 greatly increased the permeate flux, and reduced the processing time. Futhermore, product from CP-2 was found to give an especially hazy appearance in solution; leaving the final product at about pH 7 at the end of processing alleviated the problem.

3. The primary value of caramel colors is their effect on the appearance and attractiveness of products, that is, the acceptability of products. Evaluation of color concentrates indicates they fulfill the roles played by caramel colors in terms of coloring of products. However, at a given color intensity, only about ½ as much ultraviolet absorbance is present. This has not been found to interfere with beverage stability (e.g., resistance to photo-oxidation). Some caramels contribute a useful foaming property to beverages such as Root Beer soft drink. This foaming capability only partially survives the ultrafiltration process, and, therefore, requires additional study of the value of pH or ionic strength adjustment and of modifications to the original process for manufacturing the foaming SAC-1 Caramel Color.

Although the process of the present invention has been described in large part with reference to particular operating conditions, equipment and the like, it should be apparent that these specific features are merely illustrative of the wide range of variables within which the present process may be performed. Moreover, obvious modifications of the process of this invention are considered ascertainable by those skilled in the art without departing from the scope and spirit of the invention, as defined in the appended claims.

What is claimed is:

1. A process for treating Type CP-1 or CP-2 caramel color to prepare a caramel color concentrate therefrom, comprising:

(a) subjecting a mixture of said caramel color and water to ultrafiltration through a semi-permeable membrane to yeild a permeated fraction which passes through the membrane and a retained fraction which does not pass through the membrane, said retained fraction comprising high molecular weight color bodies and water, the water being present in an amount reduced from that present in the original mixture of caramel color and water;

(b) adding water to the retained fraction and subjecting the resultant mixture to ultrafiltration through a semi-permeable membrane to yield a permeated fraction which passes through the membrane and a retained fraction which does not pass through the membrane, said retained fraction comprising high molecular weight color bodies and water, the water being present in an amount reduced from that present in the resultant mixture; and (c) subjecting the retained fraction of step (b) to ultrafiltration through a semi-permeable membrane to yield a permeated fraction which passes through the membrane and a retained concentrated product fraction, which does not pass through the membrane, said retained concentrated product fraction comprising high molecular weight color bodies and water, the water being present in an amount reduced from that present in the retained fraction of step (b), wherein the pH of said mixture of caramel color and water, said resultant mixture and said retained fraction of step (b) is maintained above 6.5 during said ultrafiltration.

* * * * *